(12) United States Patent
Nagaoka

(10) Patent No.: US 6,317,270 B2
(45) Date of Patent: *Nov. 13, 2001

(54) OPTICAL SYSTEM

(75) Inventor: Toshiyuki Nagaoka, Akishima (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/725,914

(22) Filed: Nov. 30, 2000

Related U.S. Application Data

(62) Division of application No. 09/088,376, filed on Jun. 2, 1998, now Pat. No. 6,163,410.

(30) Foreign Application Priority Data

Jun. 3, 1997 (JP) .................................................. 9-159328

(51) Int. Cl.[7] .................................................. G02B 15/14
(52) U.S. Cl. ...................... 359/684; 359/680; 359/682; 359/685; 359/686; 359/740; 359/781
(58) Field of Search .................................. 359/676, 680, 359/682, 684, 685, 686, 740, 781

(56) References Cited

U.S. PATENT DOCUMENTS

| | | | |
|---|---|---|---|
| 2,594,020 | 4/1952 | Hopkins et al. | 359/766 |
| 4,173,396 | 11/1979 | Yokota | 359/766 |

(List continued on next page.)

FOREIGN PATENT DOCUMENTS

| | | |
|---|---|---|
| 61-231517 | 10/1986 | (JP) . |
| 61-248015 | 11/1986 | (JP) . |
| 2-079013 | 3/1990 | (JP) . |
| 5-297276 | 11/1993 | (JP) . |
| 6-82695 | 3/1994 | (JP) . |
| 9-90224 | 4/1997 | (JP) . |
| 9-179026 | 11/1997 | (JP) . |

Primary Examiner—Evelyn A Lester
(74) Attorney, Agent, or Firm—Pillsbury Winthrop LLP

(57) ABSTRACT

A zoom optical system provides a series of lens units designed to allow for zooming with minimal change in aberration resulting from the movement of the lens units. Each lens unit has a plurality of lens units. One embodiment has, in order from the object side, a first lens unit having a negative refractive power, a second lens unit having a positive refractive power, a third lens unit having a positive refractive power and a fourth lens unit having a positive refractive power wherein the second lens unit may have at least one gradient index lens element and the first lens unit is kept stationary during a change of magnification. Additional embodiments have more or fewer lens units and the refractive power of each lens unit is varied. In some embodiments, a lens unit other than the first lens unit is kept stationary.

17 Claims, 15 Drawing Sheets

U.S. PATENT DOCUMENTS

| | | | |
|---|---|---|---|
| 4,770,506 | 9/1988 | Baba | 359/654 |
| 4,776,679 | 10/1988 | Kitagishi et al. | 359/654 |
| 4,828,372 * | 5/1989 | Betensky et al. | 359/689 |
| 4,883,346 | 11/1989 | Aoki et al. | 359/652 |
| 4,907,866 | 3/1990 | Kitagishi et al. | 359/654 |
| 4,916,534 | 4/1990 | Takahashi et al. | 358/98 |
| 4,963,010 | 10/1990 | Kikuchi | 359/654 |
| 4,976,521 | 12/1990 | Ishii et al. | 359/654 |
| 5,046,833 | 9/1991 | Tsuchida et al. | 359/654 |
| 5,157,550 | 10/1992 | Tsuchida et al. | 359/689 |
| 5,313,328 | 5/1994 | Aoki | 359/654 |
| 5,315,441 | 5/1994 | Hori et al. | 359/781 |
| 5,541,775 | 7/1996 | Kiriki | 359/654 |
| 5,631,775 * | 5/1997 | Shibata | 359/683 |
| 5,663,835 * | 9/1997 | Shibayama | 359/684 |
| 5,684,639 * | 11/1997 | Ohtake | 359/693 |
| 5,731,906 | 3/1998 | Morita | 359/652 |
| 5,739,960 * | 4/1998 | Tanaka | 359/683 |
| 5,748,384 | 5/1998 | Sensui | 359/686 |
| 5,768,025 | 6/1998 | Togino et al. | 359/630 |
| 5,805,350 | 9/1998 | Yamamoto | 359/686 |
| 5,835,272 * | 11/1998 | Kodama | 359/557 |
| 5,841,586 | 11/1998 | Nagaoka | 359/654 |
| 5,870,229 | 2/1999 | Tsuchida | 359/654 |
| 5,889,620 * | 3/1999 | Furuta | 359/689 |
| 5,956,178 * | 9/1999 | Furuta | 359/432 |
| 5,986,818 | 11/1999 | Hashimura | 359/654 |
| 5,991,092 * | 11/1999 | Tsutsumi | 359/684 |
| 5,995,295 | 11/1999 | Nagaoka | 359/654 |
| 5,999,329 * | 12/1999 | Ohtake | 359/686 |
| 6,160,669 * | 12/2000 | Nagaoka | 359/686 |

* cited by examiner

OPTICAL SYSTEM

This is a division of application Ser. No. 09/088,376, filed Jun. 2, 1998, now U.S. Pat. No. 6,163,410.

BACKGROUND OF THE INVENTION a) Field of the Invention

The present invention relates to an optical lens system which is to be used in various kinds of optical devices.

b) Description of the Prior Art

It is generally desirable for a zoom optical system to correct aberrations independently in each lens unit so that aberrations are not only corrected in a standard position but also varied little by changing a magnification. To meet this goal, each lens unit is usually composed of a plurality of lens elements.

Recently, compact configuration and lowering of manufacturing cost are desirable for zoom optical devices to be used in various kinds of optical devices. For making a zoom optical system more compact, it is sufficient from the paraxial theory to increase the refractive power of a lens unit which has a vari-focal function, thereby shortening the distance which the lens unit must move to produce a given change of magnification. When a refractive power of the lens unit is increased, however, the lens unit produces greater to reduce the amount of aberration it is necessary, to compose the lens unit of an increased number of lens elements. When the lens unit is composed of an increased number of lens elements, it is impossible to maintain compact size and low cost. This problem sets limits to compact configuration and reduction in manufacturing costs of zoom optical systems which are composed of homogeneous lens elements.

Zoom optical systems may be made more compact by using radial type gradient index lens elements which have refractive index distributions in media thereof in radial directions from optical axes.

Since a radial type gradient index lens element has a refractive index distribution, it may better correct aberrations than may a homogeneous lens element. Owing to a refractive index of the medium in particular, the radial type gradient index lens element has a characteristic excellent in correction of a Petzval's sum and chromatic aberration.

As conventional examples of optical systems which use radial type gradient index lens elements, there are known lens systems disclosed, for example, as fifth and sixth embodiments of Japanese Patent Kokai Publication No. Sho 61-231517, a second embodiment of Japanese Patent Kokai Publication No. Sho 61-248015, and third embodiment of Japanese Patent Kokai Publication No. Hei 2-79013. However, each of these zoom optical systems has a zoom ratio on the order of 3 and is composed of a larger number of lens elements, or 9 to 13 lens elements.

SUMMARY OF THE INVENTION

A primary object of the present invention is to provide an optical system which is composed of a small number of lens elements and can be manufactured at a low cost.

The optical system according to the present invention in one embodiment is characterized in that it is composed, in order from the object side, of a first lens unit having a negative refractive power, a second lens unit having a positive refractive power, a third lens unit having a negative refractive power and a fourth lens unit having a positive refractive power, and that the second lens unit comprises at least one gradient index lens element.

This optical system according to the present invention is a zoom optical system whose magnification is changed by moving the second lens unit along an optical axis.

A second embodiment of the present invention is characterized in that it is composed, in order from the object side, of a first lens unit having a negative refractive power, a second lens unit having a positive refractive power and a third lens unit having a positive refractive power, that a magnification of the optical system is changed mainly by moving the second lens unit along an optical axis and that the optical system comprises at least one gradient index lens element.

Further, a third embodiment is characterized in that it is composed of a plurality of lens units, that it comprises an aperture stop and at least one gradient index lens element, that a lens unit which comprises the gradient index lens element is moved along an optical axis mainly for changing a magnification of the optical system and that the aperture stop is moved along the optical axis together with the lens unit which is moved for the change of the magnification.

DETAILED DESCRIPTION OF THE PREFERRED EMBODIMENTS

Figure 1:
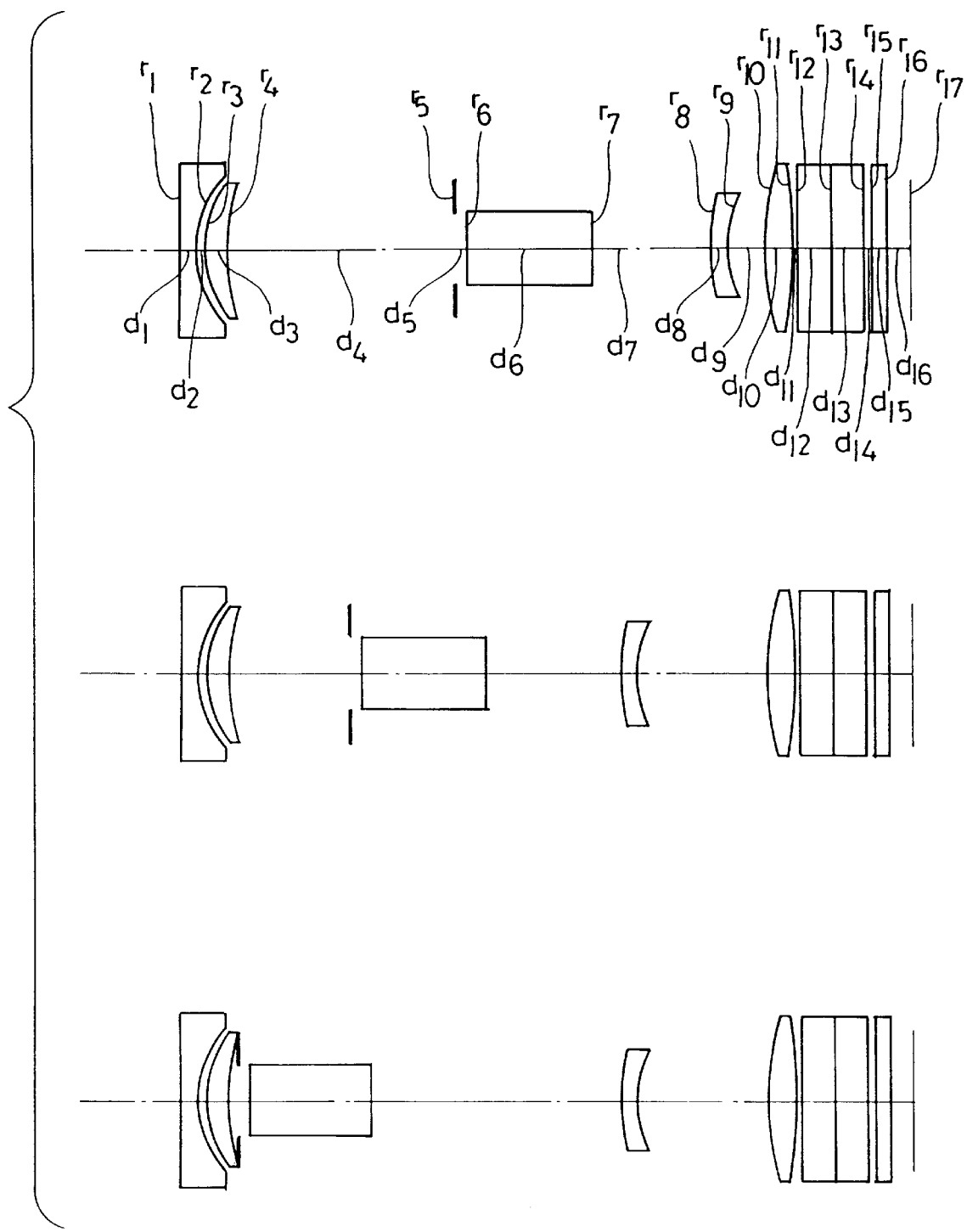
FIGS. 1 through 12 show sectional views illustrating compositions of first through twelfth embodiments of the optical system according to the present invention.

The optical system according to the present invention in one embodiment is characterized in that it is composed, in order from the object side, of a first lens unit which has a negative refractive power, a second lens unit which has a positive refractive power, a third lens unit which has a negative refractive power and a fourth lens unit which has a positive refractive power, and that the second lens unit comprises at least one gradient index lens element which has a refractive index distribution. Further, the optical system according to the present invention changes its magnification by moving the second lens unit along an optical axis.

A radial type gradient index lens element has provides greater correction of aberrations than a homogeneous lens element. For correcting aberrations independently in each lens unit which is to be used for composing a zoom optical system, the lens unit is generally composed of a plurality of lens elements. When the lens unit is composed of a small number of lens elements to lower a manufacturing cost of the zoom optical system, the lens unit produces aberrations in large amounts, thereby making it difficult to obtain favorable imaging performance. Use of a radial type gradient index lens element makes it possible to compose a compact lens system of fewer lens elements than with homogeneous lens elements, and at a low cost.

For manufacturing a compact zoom optical system at a low cost, it is desirable to dispose at least one radial type gradient index lens element in a lens unit which contributes to a change of a magnification.

When a refractive power of the lens unit which contributes to the change of the magnification is increased to configure a zoom optical system compact, it is difficult to correct chromatic aberration and a Petzval's sum which are produced in amounts largely dependent on refractive power. These aberrations cannot be corrected even by using an aspherical surface and must be corrected by using an increased number of lens elements when the zoom optical system is composed only of homogeneous lens elements. For correcting chromatic aberration and the Petzval's sum, it is desirable to configure the lens unit so as to comprise at least one radial type gradient index lens element which is excellent in correction of these aberrations. By using a radial type gradient index lens element in the lens unit which contributes to the change of the magnification in particular, it is possible to favorably correct the Petzval's sum and chromatic aberration without increasing the number of lens elements even when the refractive power of the lens unit is increased for producing a compact lens system. In a zoom optical system which is composed of four lens units, or first negative, second positive, third negative and fourth positive lens units, for example, it is desirable to use a radial type gradient index lens element in the second lens unit which has a main vari-focal function.

For this reason, the optical system adopts the composition which is described above.

Further, the optical system according to the present invention which has a second embodiment characterized in that it is composed, in order from the object side, of a first lens unit which has a negative refractive power, a second lens unit which has a positive refractive power and a third lens unit which has a positive refractive power, that a magnification of the optical system is changed mainly by moving the second lens unit along an optical axis and that the optical system uses at least one radial type gradient index lens element.

This zoom optical system according to the present invention can also be made compact and manufactured at a low cost.

For the optical system according to the present invention which is a zoom optical system composed of the three units, one negative and two positive lens units, it is also desirable to use a radial type gradient index lens element in the second lens unit which mainly contributes to the change of the magnification.

In case of a homogeneous lens element, amounts of a Petzval's sum and chromatic aberration to be produced are determined once a refractive power and a kind of glass material are determined. In case of a radial type gradient index lens element, in contrast, it is possible to set amounts of these aberrations to be produced at desired values by controlling each parameter as described above.

It is possible to set amounts of aberrations at desired values by using a radial type gradient index lens element in a zoom optical system and controlling each parameter.

A refractive index distribution in a radial type gradient index lens element can be approximated by the following square formula (a):

$$n_\lambda(r) = \sum_{i=0}^{\infty} N_{i\lambda} r^{2i} \tag{a}$$

wherein the reference symbol r represents a radial distance from the optical axis, the reference symbol $N_\lambda(r)$ designates a refractive index at a radial distance of r for a wavelength of $\lambda$ and the reference symbol $N_{i\lambda}$ denotes a refractive index distribution coefficient of the 2i'th order for the wavelength $\lambda$.

Further, longitudinal chromatic aberration of the first order, i.e., chromatic aberration PAC for the d-line, C-line and F-line, and a Petzval's sum PTZ are expressed by formulae (b) and (c) respectively:

$$PAC = K(\phi_S/V_{0d} + \phi_m/V_{1d}) \tag{b}$$

$$PTZ = \phi_S/N_{0d} + \phi_m/N_{0d}^2 \tag{c}$$

wherein the reference symbol K represents a constant which is dependent on a height of an axial ray and an angle of the axial ray on a final surface, the reference symbol $V_{0d}$ designates an Abbe's number of the radial type gradient index lens element on the optical axis for the d-line, the reference symbol $V_{id}$ denotes a value expressing dispersion corresponding to the refractive index distribution coefficient of the 2i'th order, the reference symbol $\phi_s$ represents a refractive power of surface of the radial type gradient index lens for the d-line when the lens element is considered as a thin lens element and the reference symbol $\phi_m$ designates a refractive power of medium of the radial type gradient index lens element:

$V_{0d}$, $V_{id}$ and $\phi_m$ being given by formulae (d), (e) and (f) shown below respectively:

$$V_{0d} = (N_{0d} - 1)/(N_{0F} - N_{0C}) \tag{d}$$

$$V_{id} = N_{id}/(N_{iF} - N_{iC}) (1=1, 2, 3, \ldots) \tag{e}$$

$$\phi_m \approx -2N_{1d} t_G \tag{f}$$

wherein the reference symbol $t_G$ represents a thickness of the radial type gradient index lens element.

As apparent from the formulae (b) and (c), chromatic aberration and a Petzval's sum of a radial type gradient index lens element which is considered as an independent lens element can be controlled as desired by selecting adequate values for the second terms which is dependent on the refractive power in the formulae. When the refractive power has an extremely small value, for example, the second terms are nearly zeroed, thereby making it difficult to correct chromatic aberration and a Petzval's sum mentioned above.

For the optical system according to the present invention which has the composition described above, it is desirable that the radial type gradient index lens element satisfies the following condition (1):

$$0.01 < |N_{1d}' t_G| < 1 \tag{1}$$

When the condition (1) is satisfied, it is possible to favorably correct chromatic aberration and a Petzval's sum. If the lower limit of 0.01 of the condition (1) is exceeded, the refractive power will be weakened, thereby making it difficult to correct chromatic aberration and a Petzval's sum favorably. If the upper limit of 1 of the condition (1) is exceeded, in contrast, chromatic aberration and a Petzval's sum will be overcorrected.

Further, it is desirable for correcting chromatic aberration and a Petzval's sum more favorably, it is desirable to satisfy, in place of the condition (1), the following condition (1-1):

$$0.02 < |N_{1d}' t_G| < 0.2 \tag{1-1}$$

As apparent from the formula (f), it is sufficient for increasing a refractive power of a radial type gradient index lens element to enlarge a value of the distribution coefficient of the second order $N_{1d}$ or a difference $\Delta n$ between refractive index distributions of the optical axis and a marginal portion or thicken the lens element. However, Δn can be enlarged only within a certain limit in practical manufacturing of radial type gradient index lens materials. When a gradient index material is prepared by an ion exchange method or a sol-gel method, for example, a long time is required for imparting a refractive index distribution which has a large value of Δn, thereby posing problems of high manufacturing cost. Accordingly, it is impossible to extremely enlarge Δn of a radial type gradient index lens element.

In order to correct chromatic aberration and a Petzval's sum effectively in the optical system according to the present invention, it is desirable that the thickness $t_G$ satisfies the following condition (2):

$$0.05 < t_G/\sqrt{f_W \cdot f_T} < 2 \qquad (2)$$

wherein the reference symbols $f_W$ and $f_T$ represent focal lengths of the optical system as a whole at a wide position and a tele position respectively.

When the condition (2) is satisfied, it is possible to impart a refractive power to a medium which is sufficient for correcting chromatic aberration and a Petzval's sum without extremely enlarging Δn. If the lower limit of 0.05 of the condition (2) is exceeded, chromatic aberration and a Petzval's sum will be undercorrected. If the upper limit of 2 is exceeded, in contrast, these aberrations will undesirably be overcorrected.

It is more desirable to satisfy, in place of the condition (2), the following condition (2-1):

$$0.1 < t_G/\sqrt{f_W \cdot f_T} < 1.5 \qquad (2\text{-}1)$$

Further, it is still more desirable to satisfy the following condition (2-2):

$$0.3 < t_G/\sqrt{f_W \cdot f_T} < 1 \qquad (2\text{-}2)$$

The optical system according to the present invention has as a third embodiment an optical system, characterized in that it is composed of a plurality of lens units and comprises an aperture stop, that at least one lens element disposed in the optical system is a gradient index lens element having a refractive index distribution in its medium, that the lens unit which has a gradient index lens element is moved along an optical axis to change a magnification and that the aperture stop is moved along the optical axis together with the moving lens unit.

When a gradient index lens element is used in a lens unit which is moved to change a magnification in a zoom optical system, it is desirable to move the gradient index lens element along an optical axis together with an aperture stop. By adopting such a composition, heights of off-axial rays incident on the gradient index lens element are kept nearly constant independently of zoom conditions, thereby making it possible to correct aberrations favorably in all the conditions.

If the gradient index lens element and the aperture stop are not moved along the optical axis together with each other it will be difficult to correct offaxial aberrations such as coma in particular in all the conditions from the wide position to the tele position.

The ability to move the gradient index lens element and the aperture stop along the optical axis together with each other provides a merit from a viewpoint of manufacturing cost in addition to the merit for correction of aberrations. This is because off-axial rays are kept relatively low in the vicinities of the aperture stop and makes it possible to reduce the diameter of the gradient index lens element. When the gradient index lens element has a small diameter, the manufacturing cost of the gradient index lens element is low, thereby making it possible to manufacture the optical system at a low cost. For lowering a manufacturing cost of the optical system, it is effective to use a gradient index lens element even when the gradient index lens element is immovable.

When a gradient index lens element is to be disposed in the vicinity of an aperture stop, this lens element is not limited to a radial type gradient index lens element but may be an axial type gradient index lens element or an aspherical lens element. The gradient index lens element and the aperture stop can be assembled in the same lens barrel member so that they are moved along an optical axis. Further, the gradient index lens element and the aperture stop may be assembled in separate lens barrel members and moved along the optical axis respectively.

Furthermore, it is desirable that a refractive power of a radial type gradient index lens element has a sign (positive or negative sign) which is the same as that of a refractive power of the lens unit which is to use the radial type gradient index lens element. Such a sign of the refractive power provides an advantage to correct a Petzval's sum in particular.

As apparent from the formula (c), the denominator of the second term of the formula expressing a Petzval's sum of a radial type gradient index is squared. Therefore, it is possible to configure a radial type gradient index lens element so as to produce a Petzval's sum which is smaller than that to be produced by a homogeneous lens element having a refractive power which is the same as that of the radial type gradient index lens element. Accordingly, it is desirable to impart a refractive power to a radial type gradient index lens element having a sign which is the same as that of a refractive power of the lens unit. When a radial type gradient index lens element is to be used in a lens unit which mainly contributes to a change of a magnification in particular, such a sign of a refractive power is desirable to configure compactly an optical system. When a radial type gradient index lens element is to be used in a second lens unit having a main vari-focal function in an optical system which has the composition described above, or is composed, in order from the object side, of a first lens unit having a negative refractive power, a second lens unit having a positive refractive power and a subsequent lens unit(s), for example, it is desirable that a medium of the radial type gradient index lens element has a positive refractive power.

When a second lens unit has a main vari-focal function in a zoom optical system which is composed of four lens units in the order: negative, positive, negative and positive or three lens units in the order: negative, positive and positive, it is preferable to select a lens unit other than the second lens unit as a lens unit movable for correcting a deviation of an image surface caused by changing a magnification.

In case of an optical system in which two or more lens units have vari-focal functions, it is possible to configure the optical system compactly and lower the manufacturing cost of the optical system by using the radial type gradient index lens element in either of the lens units which have the vari-focal functions. In a case where a second lens unit and a third lens unit have vari-focal functions in a vari-focal optical system which is composed of a first lens unit having a positive refractive power, a second lens unit having a negative refractive power, a third lens unit having a positive refractive power and subsequent lens unit or units, for example, it is possible to configure the optical system compactly and lower the manufacturing cost of the optical system by using a radial type gradient index lens element in either the second lens unit or the third lens unit or in both.

Since a planar surface can be polished at a lower cost than a spherical surface, it is desirable that a radial type gradient index lens element be used in the zoom optical system according to the present invention which has any one of the compositions described above has at least one planar surface. A radial type gradient index lens element which has two planar surfaces is more desirable to lower a manufacturing cost of the optical system.

It is desirable to configure an optical system which uses an image pickup device such as a CCD so that off-axial rays are incident at small angles onto an image surface for preventing light intensities from being insufficient at marginal portions of an image. In order to reduce angles of incidence of off-axial rays on an image surface, it is desirable to dispose a positive lens element or a positive cemented lens component on the image side in the optical system.

In order to compose a compact optical system of a small number of lens elements and at a low cost, it is desirable to dispose a positive lens element or a positive lens component on the image side in the lens system composed of a plurality of lens units and arrange a radial type gradient index lens element on the object side of the positive lens element or the positive lens component. By selecting the composition described above, it is possible to obtain a zoom optical system consisting of a small number of lens elements since the composition allows a light bundle coming from the radial type gradient index lens element to be focused onto an image surface while a lens unit comprising the radial type gradient index lens element is moved along an optical axis.

In order to configure an optical system which requires a certain length of back focal length so as to be compact at a low cost, it is desirable to configure it as a lens system composed of a plurality of lens units including a lens unit wherein a positive lens element is disposed on the image side, a negative lens element is disposed on the object side of this positive lens element and a radial type gradient index lens element is disposed on the object side of this negative lens element. The negative lens element disposed in this lens unit has a main function to increase the back focal length of the lens system.

In the zoom optical system according to the present invention which has the third composition consisting of the plurality of lens units, it is desirable that a first lens unit disposed on the object side is kept stationary during a change of a magnification. When the first lens unit is kept stationary, it is possible to configure a lens barrel so as to have enhanced strength to external impact and pressure. If the first lens unit is movable, a movable mechanism of a lens barrel may be damaged by an external impact or pressure.

For correcting aberrations in the zoom optical system which consists of the plurality of lens units, it is desirable that lens unit which is disposed on the image side is kept stationary during the change of the magnification. Since the lens unit which is disposed on the image side mainly has an imaging function, it is possible to keep variations of aberrations within narrow ranges by keeping this lens unit stationary.

In order to correct chromatic aberration sufficiently with a radial gradient index lens element in the zoom optical system which has any one of the first, second and third compositions, it is desirable to satisfy the following condition (3):

$$1/V_{1d} < 0.15 \tag{3}$$

If the condition (3) is not satisfied, chromatic aberration will be undercorrected.

It is more preferable to satisfy, in place of the condition (3), the following condition (3-1):

$$-0.1 < 1/V_{1d} < 0.1 \tag{3-1}$$

If the upper limit of 0.1 of the condition (3-1) is exceeded, chromatic aberration will be undercorrected. If the lower limit of −0.1 is exceeded, chromatic aberration will be overcorrected.

It is more desirable to satisfy, in place of the condition (3-1), the following condition (3-2):

$$-0.02 < 1/V_{1d} < 0.02 \tag{3-2}$$

When the zoom optical system is to be used as an optical system which must form an image having a precise quality in particular, it is desirable to satisfy the following condition (3-3):

$$-0.01 < 1/V_{1d} < 0.01 \tag{3-3}$$

The optical system according to the present invention described above is used as an optical system for silver salt cameras, video cameras, digital cameras, endoscopes, image pickup systems, measuring instruments and so on.

For manufacturing a radial type gradient index lens material, for example, by the ion exchange method or the sol-gel method, it is not easy to control a refractive index distribution with high precision and a refractive index distribution may deviate from a design value at an outer circumferential portion of the lens material. When the deviation is corrected by working an outside diameter, the lens material which has a refractive index distribution deviated from the design value can be used as a satisfactory lens material. It is possible to obtain a relatively satisfactory lens material, for example, by cutting off the outer circumferential portion of the lens material or adding a transparent material such as a resin. Further, it is possible to dispose a stop so as to shield the outer circumferential portion so as to prevent rays from passing through this portion.

Since radial type gradient index lens elements allow chromatic aberration to be controlled to a desired value as described above, it is possible to compose, using radial type gradient index lens elements, a prism optical system which produces only a small chromatic aberration.

When an optical axis is refracted by imparting a prism function to a glass material, chromatic aberration is usually produced due to a refractive index of a refracting surface which is different for different wavelengths. When a prism optical system is composed of radial type gradient index lens elements, it is possible to correct chromatic aberration favorably in the prism optical system as a whole by controlling chromatic aberration to be produced by a medium to a desired value. In this case, it is desirable to use a single radial type gradient index lens element for manufacturing the optical system at a low cost.

As various kinds of optical systems are configured more compactly, lens elements used in these optical systems tend to have smaller diameters. When lens elements have smaller diameters, however, it is difficult to assemble a plurality of lens elements with high precision. In particular, it is not easy to assemble lens elements having diameters of 10 mm or smaller with high precision. Accordingly, it is desired to compose optical systems of small numbers of lens elements and it is preferable also for this purpose to use gradient index lens elements. Use of a gradient index lens element makes it possible to obtain an optical system which has favorable optical performance and is composed of lens elements in a number smaller than that of homogeneous lens elements, thereby making lens assembly easier. Further, since gradient index lens elements are likely to be thick and have thick edges, these lens element can easily be held and assembled with high precision.

It is effective to use gradient index lens elements as lens elements which have diameters of 10 mm or smaller or more effective to use them as lens elements which have diameters of 5 mm or smaller. When production of gradient index lens elements is taken into consideration, however, it is desirable that gradient index lens elements have diameters of at least 0.1 mm, and gradient index lens elements which have extremely small diameters can hardly be held and worked. For this reason, it is more desirable gradient index lens elements have diameters of at least 0.2 mm. It is therefore desirable that gradient index lens elements to be used in the optical system according to the present invention has a diameter not smaller than 0.1 mm and not larger than 10 mm. It is more desirable that the gradient index lens element to be used in the optical system according to the present invention has a diameter which is not smaller than 0.2 mm and not larger than 5 mm.

Further, a radial type gradient index lens element which has a small diameter can be manufactured at a low cost and is desirable from a viewpoint of a manufacturing cost of the optical system. It is therefore desirable for the optical system according to the present invention to use an image pickup device which has an image plane having a diagonal length not exceeding ½ inch. It is more desirable to use an image pickup device which has an image plane having a diagonal length not exceeding ⅓ inch.

In the recent years where image pickup devices such as CCDs have picture elements at higher densities, image pickup devices tend to have smaller diameters. It is therefore desirable to adopt gradient index lens elements also for optical systems which use small image pickup devices. It is effective in particular to adopt gradient index lens elements for optical systems which use image pickup devices such as CCDs having image planes not exceeding ½ inch in diagonal lengths (image height of 4 mm). It is more effective to adopt gradient index lens elements in optical systems which use image pickup devices such as CCDs having image planes not exceeding ⅓ inch in diagonal lengths (image height of 3 mm).

Further, a refractive index distribution of a gradient index material to be used for the optical system according to the present invention is approximated by the square equation expressed as the formula (a). However, a refractive index material which has a refractive index distribution expressed by a formula other than the formula (a) can also be approximated by the formula (a) and used for the optical system according to the present invention.

Furthermore, the optical system according to the present invention is not limited those embodiments and examples discussed herein but may have a composition which substantially satisfies the requirements defined by the claims.

Optical systems preferred as the embodiments of the present invention have compositions illustrated in FIGS. 1 through 11 and numerical data which is listed below:

Embodiment 1

$f = 6.56 \sim 10.78 \sim 18.91$, F nunber = $3.6 \sim 4.7 \sim 6.2$
$2\omega = 60.4° \sim 36° \sim 20°$
$r_1 = \infty$
$\quad d_1 = 0.8000 \quad n_1 = 1.81600 \quad \nu_1 = 46.62$
$r_2 = 5.6195$
$\quad d_2 = 0.4788$
$r_3 = 6.1295$
$\quad d_3 = 0.9983 \quad n_2 = 1.84666 \quad \nu_2 = 23.78$
$r_4 = 11.5281$
$\quad d_4 = D_1$ (variable)
$r_5 = \infty$ (stop)
$\quad d_5 = 0.5000$
$r_6 = \infty$
$\quad d_6 = 5.9864 \quad n_3$ (gradient index lens element)
$r_7 = \infty$
$\quad d_7 = D_2$ (variable)
$r_8 = 11.6948$
$\quad d_8 = 0.8000 \quad n_4 = 1.74077 \quad \nu_4 = 27.79$
$r_9 = 5.7435$
$\quad d_9 = D_3$ (variable)
$r_{10} = 15.2627$
$\quad d_{10} = 1.4009 \quad n_5 = 1.88300 \quad \nu_5 = 40.76$
$r_{11} = -26.2228$
$\quad d_{11} = 0.1993$
$r_{12} = \infty$
$\quad d_{12} = 1.6000 \quad n_6 = 1.51633 \quad \nu_6 = 64.14$
$r_{13} = \infty$
$\quad d_{13} = 1.6000 \quad n_7 = 1.51633 \quad \nu_7 = 64.14$
$r_{14} = \infty$
$\quad d_{14} = 0.4000$
$r_{15} = \infty$
$\quad d_{15} = 0.7500 \quad n_8 = 1.51633 \quad \nu_8 = 64.14$
$r_{16} = \infty$
$\quad d_{16} = 1.1255$
$r_{17} = \infty$ (image)

| | | | |
|---|---|---|---|
| f | 6.56 | 10.78 | 18.91 |
| $D_1$ | 11.06493 | 5.95704 | 0.50000 |
| $D_2$ | 5.81906 | 6.47619 | 11.96499 |
| $D_3$ | 1.82166 | 6.33050 | 6.36121 | gradient index lens element

| wavelength | $N_0$ | $N_1$ |
|---|---|---|
| d line | 1.65000 | $-9.2600 \times 10^{-3}$ |
| C line | 1.64512 | $-9.2557 \times 10^{-3}$ |
| F line | 1.66138 | $-9.2700 \times 10^{-3}$ |

Embodiment 2

$f = 6.68 \sim 10.93 \sim 19.39$, F number = $2.4 \sim 3.1 \sim 4.2$
$2w = 60° \sim 36° \sim 19.8°$
$r_1 = -361.5471$
$\quad d_1 = 1.0000 \quad n_1 = 1.81600 \quad \nu_1 = 46.62$
$r_2 = 7.0279$
$\quad d_2 = 0.8270$
$r_3 = 7.6415$
$\quad d_3 = 2.4141 \quad n_2 = 1.84666 \quad \nu_2 = 23.78$
$r_4 = 12.9691$
$\quad d_4 = D_1$ (variable)
$r_5 = \infty$ (stop)
$\quad d_5 = 0.5000$
$r_6 = \infty$
$\quad d_6 = 4.7683 \quad n_3$ (gradient index lens element)
$r_7 = \infty$
$\quad d_7 = D_2$ (variable)
$r_8 = 11.9747$
$\quad d_8 = 0.9999 \quad n_4 = 1.84666 \quad \nu_4 = 23.78$
$r_9 = 6.5959$
$\quad d_9 = D_3$ (variable)
$r_{10} = 21.3761$
$\quad d_{10} = 1.8432 \quad n_5 = 1.88300 \quad \nu_5 = 40.76$
$r_{11} = -21.3051$
$\quad d_{11} = 1.0000$
$r_{12} = \infty$
$\quad d_{12} = 1.6000 \quad n_6 = 1.51633 \quad \nu_6 = 64.14$
$r_{13} = \infty$
$\quad d_{13} = 1.6000 \quad n_7 = 1.51633 \quad \nu_7 = 64.14$
$r_{14} = \infty$
$\quad d_{14} = 1.0000$
$r_{15} = \infty$
$\quad d_{15} = 0.7500 \quad n_8 = 1.51633 \quad \nu_8 = 64.14$
$r_{16} = \infty$ -continued

| | | | |
|---|---|---|---|
| | $d_{16} = 1.1681$ | | |
| $r_{17} = \infty$ (image) | | | |
| f | 6.68 | 10.93 | 19.39 |
| $D_1$ | 14.87539 | 8.67516 | 2.00000 |
| $D_2$ | 7.18816 | 8.25510 | 15.35672 |
| $D_3$ | 0.95504 | 6.09207 | 5.68683 |
| gradient index lens element | | | |
| wavelength | $N_0$ | $N_1$ | $N_2$ |
| d line | 1.75000 | $-9.4769 \times 10^{-3}$ | $4.7643 \times 10^{-6}$ |
| C line | 1.74250 | $-9.4684 \times 10^{-3}$ | $4.7643 \times 10^{-6}$ |
| F line | 1.76750 | $-9.4968 \times 10^{-3}$ | $4.7643 \times 10^{-6}$ |

Embodiment 3

$f = 6.58 \sim 10.05 \sim 18.18$, F number = $3.8 \sim 4.0 \sim 4.8$
$2\omega = 59.8° \sim 36.2° \sim 20°$

| | | | |
|---|---|---|---|
| $r_1 = 16.8604$ | | | |
| | $d_1 = 2.1134$ | $n_1 = 1.83481$ | $\nu_1 = 42.72$ |
| $r_2 = -391.7314$ | | | |
| | $d_2 = D_1$ (variable) | | |
| $r_3 = 103.5216$ | | | |
| | $d_3 = 1.0000$ | $n_2 = 1.61800$ | $\nu_2 = 63.33$ |
| $r_4 = 6.9508$ | | | |
| | $d_4 = 1.4921$ | | |
| $r_5 = -7.4105$ | | | |
| | $d_5 = 1.0000$ | $n_3 = 1.72916$ | $\nu_3 = 54.68$ |
| $r_6 = -68.1757$ | | | |
| | $d_6 = D_2$ (variable) | | |
| $r_7 = \infty$ (stop) | | | |
| | $d_7 = 1.0000$ | | |
| $r_8 = 87.3294$ | | | |
| | $d_8 = 5.8926$ | $n_4$ (gradient index lens element) | |
| $r_9 = \infty$ | | | |
| | $d_9 = 4.0561$ | | |
| $r_{10} = 12.5839$ | | | |
| | $d_{10} = 1.0000$ | $n_5 = 1.84666$ | $\nu_5 = 23.78$ |
| $r_{11} = 8.5354$ | | | |
| | $d_{11} = 5.1373$ | | |
| $r_{12} = 13.2633$ | | | |
| | $d_{12} = 1.2214$ | $n_6 = 1.83481$ | $\nu_6 = 42.72$ |
| $r_{13} = 136.3787$ | | | |
| | $d_{13} = D_3$ (variable) | | |
| $r_{14} = \infty$ | | | |
| | $d_{14} = 1.8000$ | $n_7 = 1.61700$ | $\nu_7 = 62.80$ |
| $r_{15} = \infty$ | | | |
| | $d_{15} = 0.2000$ | | |
| $r_{16} = \infty$ | | | |
| | $d_{16} = 0.7500$ | $n_8 = 1.51633$ | $\nu_8 = 64.14$ |
| $r_{17} = \infty$ | | | |
| | $d17 = 1.1715$ | | |
| $r_{18} = \infty$ (image) | | | |
| f | 6.58 | 10.05 | 18.18 |
| $D_1$ | 1.06245 | 2.85460 | 3.49323 |
| $D_2$ | 10.72360 | 6.43554 | 0.50000 |
| $D_3$ | 0.49996 | 2.33703 | 8.32438 |
| gradient index lens element | | | |
| wavelength | $N_0$ | $N_1$ | |
| d line | 1.65000 | $-9.2600 \times 10^{-3}$ | |
| C line | 1.64512 | $-9.2557 \times 10^{-3}$ | |
| F line | 1.66138 | $-9.2700 \times 10^{-3}$ | |

Embodiment 4

$f = 6.12 \sim 10.37 \sim 17.41$, F number = $3.1 \sim 3.3 \sim 3.4$
$2\omega = 64° \sim 37.8° \sim 22.8°$

| | | | |
|---|---|---|---|
| $r_1 = 21.5966$ | | | |
| | $d_1 = 2.4811$ | $n_1 = 1.84666$ | $\nu_1 = 23.78$ |
| $r_2 = 83.9279$ | | | |
| | $d_2 = D_1$ (variable) | | |
| $r_3 = 2148.0415$ | | | |
| | $d_3 = 0.7999$ | $n_2 = 1.77250$ | $\nu_2 = 49.60$ |
| $r_4 = 7.7737$ | | | |
| | $d_4 = D_2$ (variable) | | |
| $r_5 = \infty$ (stop) | | | |
| | $d_5 = 1.0000$ | | |
| $r_6 = \infty$ | | | |
| | $d_6 = 7.0573$ | $n_3$ (gradient index lens element) | |
| $r_7 = \infty$ | | | |
| | $d_7 = D_3$ (variable) | | |
| $r_8 = 25.3819$ | | | |
| | $d_8 = 0.7999$ | $n_4 = 1.84666$ | $\nu_4 = 23.78$ |
| $r_9 = 6.9348$ | | | |
| | $d_9 = D_4$ (variable) | | |
| $r_{10} = 160.7405$ | | | |
| | $d_{10} = 2.0020$ | $n_5 = 1.84666$ | $\nu_5 = 23.78$ |
| $r_{11} = -9.8318$ | | | |
| | $d_{11} = D_5$ (variable) | | |
| $r_{12} = \infty$ | | | |
| | $d_{12} = 1.6000$ | $n_6 = 1.51633$ | $\nu_6 = 64.14$ |
| $r_{13} = \infty$ | | | |
| | $d_{13} = 1.6000$ | $n_7 = 1.51633$ | $\nu_7 = 64.14$ |
| $r_{14} = \infty$ | | | |
| | $d_{14} = 1.5000$ | | |
| $r_{15} = \infty$ | | | |
| | $d_{15} = 0.7500$ | $n_8 = 1.51633$ | $\nu_8 = 64.14$ |
| $r_{16} = \infty$ | | | |
| | $d_{16} = 1.1568$ | | |
| $r_{17} = \infty$ (image) | | | |
| f | 6.12 | 10.37 | 17.41 |
| $D_1$ | 1.89674 | 6.02579 | 9.83419 |
| $D_2$ | 15.19674 | 7.32933 | 1.00000 |
| $D_3$ | 2.27608 | 0.14807 | 0.42202 |
| $D_4$ | 0.92932 | 3.69229 | 5.15328 |
| $D_5$ | 0.19982 | 3.32183 | 4.12121 |
| gradient index lens element | | | |
| wavelength | $N_0$ | $N_1$ | $N_2$ |
| d line | 1.65000 | $-9.2600 \times 10^{-3}$ | $1.0785 \times 10^{-5}$ |
| C line | 1.64512 | $-9.2557 \times 10^{-3}$ | $1.0780 \times 10^{-5}$ |
| F line | 1.66138 | $-9.2700 \times 10^{-3}$ | $1.0796 \times 10^{-5}$ |
| g line | 1.67083 | $-9.2518 \times 10^{-3}$ | $1.1185 \times 10^{-5}$ |

Embodiment 5

$f = 4.75 \sim 8.67 \sim 13.94$, F number = $2.7 \sim 3.8 \sim 4.8$
$2\omega = 71° \sim 40.5° \sim 24.2°$

| | | | |
|---|---|---|---|
| $r_1 = 295.4949$ | | | |
| | $d_1 = 1.6000$ | $n_1 = 1.84666$ | $\nu_1 = 23.78$ |
| $r_2 = -33.3209$ | | | |
| | $d_2 = 0.2000$ | | |
| $r_3 = -61.1954$ | | | |
| | $d_3 = 0.8000$ | $n_2 = 1.61800$ | $\nu_2 = 46.62$ |
| $r_4 = 5.4615$ | | | |
| | $d_4 = 2.0212$ | | |
| $r_5 = 6.3586$ | | | |
| | $d_5 = 1.6000$ | $n_3 = 1.84666$ | $\nu_3 = 23.78$ |
| $r_6 = 7.8635$ | | | |
| | $d_6 = D_1$ (variable) | | |
| $r_7 = \infty$ | | | |
| | $d_7 = 6.9390$ | $n_4$ (gradient index lens element) | |
| $r_8 = \infty$ | | | |
| | $d_8 = D_2$ (variable) | | |
| $r_9 = 6.7708$ | | | |
| | $d_9 = 0.7997$ | $n_5 = 1.84666$ | $\nu_5 = 23.78$ |
| $r_{10} = 4.5573$ | | | |
| | $d_{10} = D_3$ (variable) | | |
| $r_{11} = 26.7807$ | | | |
| | $d_{11} = 1.8000$ | $n_6 = 1.81600$ | $\nu_6 = 46.62$ |
| $r_{12} = -11.9170$ | | | |
| | $d_{12} = 0.1999$ | | |
| $r_{13} = \infty$ | | | |
| | $d_{13} = 1.6000$ | $n_7 = 1.51633$ | $\nu_7 = 64.14$ |
| $r_{14} = \infty$ | | | |
| | $d_{14} = 1.6000$ | $n_8 = 1.51633$ | $\nu_8 = 64.14$ |
| $r_{15} = \infty$ | | | |
| | $d_{15} = 0.4000$ | | |
| $r_{16} = \infty$ | | | |
| | $d_{16} = 0.7500$ | $n_9 = 1.51633$ | $\nu_9 = 64.14$ |
| $r_{17} = \infty$ | | | |
| | $d_{17} = 1.1419$ | | |
| $r_{18} = \infty$ (image) | | | |
| f | 4.75 | 8.67 | 13.94 |
| $D_1$ | 11.45422 | 5.39034 | 1.00000 |

-continued

| | | | |
|---|---|---|---|
| $D_2$ | 3.98909 | 5.04270 | 11.13732 |
| $D_3$ | 2.20490 | 7.18586 | 5.47117 | gradient index lens element

| wavelength | $N_0$ | $N_1$ | $N_2$ |
|---|---|---|---|
| d line | 1.80000 | $-8.3994 \times 10^{-3}$ | $6.9866 \times 10^{-6}$ |
| C line | 1.79200 | $-8.3821 \times 10^{-3}$ | $6.9866 \times 10^{-6}$ |
| F line | 1.81867 | $-8.4397 \times 10^{-3}$ | $6.9866 \times 10^{-6}$ |
| g line | 1.83483 | $-8.4356 \times 10^{-3}$ | $6.9866 \times 10^{-6}$ |
| e line | 1.80630 | $-8.4145 \times 10^{-3}$ | $6.9866 \times 10^{-6}$ |

Embodiment 6

$f = 4.22 \sim 7.46 \sim 11.59$, F number = $3.5 \sim 3.7 \sim 3.9$
$2\omega = 59.2° \sim 32.6° \sim 21°$
$r_1 = -83.2538$
  $d_1 = 0.9563$   $n_1 = 1.72916$   $\nu_1 = 54.68$
$r_2 = 13.7980$
  $d_2 = D_1$ (variable)
$r_3 = \infty$ (stop)
  $d_3 = 1.0000$
$r_4 = 8.2784$
  $d_4 = 6.1835$   $n_2$ (gradient index lens element)
$r_5 = 3.7725$
  $d_5 = 3.4709$
$r_6 = 9.3241$
  $d_6 = 1.5000$   $n_3 = 1.72916$   $\nu_3 = 54.68$
$r_7 = -21.8979$
  $d_7 = D_2$ (variable)
$r_8 = \infty$
  $d_8 = 1.8000$   $n_4 = 1.61700$   $\nu_4 = 62.80$
$r_9 = \infty$
  $d_9 = 0.2000$
$r_{10} = \infty$
  $d_{10} = 0.7500$   $n_5 = 1.51633$   $\nu_5 = 64.14$
$r_{11} = \infty$
  $d_{11} = 1.2424$
$r_{12} = \infty$ (image)

| f | 4.22 | 7.46 | 11.5 |
|---|---|---|---|
| $D_1$ | 23.99294 | 7.93421 | 0.50000 |
| $D_2$ | 1.00000 | 2.93580 | 5.39558 | gradient index lens element

| wavelength | $N_0$ | $N_1$ |
|---|---|---|
| d line | 1.65000 | $-9.2600 \times 10^{-3}$ |
| C line | 1.64512 | $-9.2557 \times 10^{-3}$ |
| F line | 1.66138 | $-9.2700 \times 10^{-3}$ |

Embodiment 7

$f = 7.82 \sim 10.73 \sim 23.55$, F number = $2.6 \sim 3.2 \sim 5.0$
$2\omega = 45.8° \sim 23° \sim 15°$
$r_1 = -87.9283$
  $d_1 = 1.0110$   $n_1 = 1.88300$   $\nu_1 = 40.76$
$r_2 = 8.5547$
  $d_2 = 0.3932$
$r_3 = 8.7336$
  $d_3 = 3.9684$   $n_2 = 1.68893$   $\nu_2 = 31.08$
$r_4 = 94.0338$
  $d_4 = D_1$ (variable)
$r_5 = \infty$ (stop)
  $d_5 = 1.0502$
$r_6 = \infty$
  $d_6 = 11.8703$   $n_3$ (gradient index lens element)
$r_7 = 5.0684$
  $d_7 = D_2$ (variable)
$r_8 = 21.3858$
  $d_8 = 2.4007$   $n_4 = 1.60300$   $\nu_4 = 65.44$
$r_9 = -19.6447$
  $d_9 = D_3$ (variable)
$r_{10} = \infty$
  $d_{10} = 2.0200$   $n_5 = 1.51633$   $\nu_5 = 64.14$
$r_{11} = \infty$
  $d_{11} = 1.6000$   $n_6 = 1.51633$   $\nu_8 = 64.14$
$r_{12} = \infty$
  $d_{12} = 1.6000$
$r_{13} = \infty$
  $d_{13} = 0.7500$   $n_7 = 1.51633$   $\nu_7 = 64.14$
$r_{14} = \infty$
  $d_{14} = 1.1586$
$r_{15} = \infty$ (image)

| f | 7.82 | 10.78 | 23.55 |
|---|---|---|---|
| $D_1$ | 20.16326 | 15.52315 | 2.07349 |
| $D_2$ | 2.42907 | 8.51751 | 21.98237 |
| $D_3$ | 1.61275 | 0.19996 | 0.19997 | gradient index lens element

| wavelength | $N_0$ | $N_1$ | $N_2$ |
|---|---|---|---|
| d line | 1.58000 | $-6.0000 \times 10^{-3}$ | $2.0040 \times 10^{-5}$ |
| C line | 1.57652 | $-5.9775 \times 10^{-3}$ | $1.9965 \times 10^{-5}$ |
| F line | 1.58812 | $-6.0525 \times 10^{-3}$ | $2.0216 \times 10^{-5}$ |

Embodiment 8

$f = 6.55 \sim 11 \sim 19.46$, F number = $3.6 \sim 4.8 \sim 6.4$
$2\omega = 60.4° \sim 35.6° \sim 14.1°$
$r_1 = 40.9080$
  $d_1 = 0.7999$   $n_1 = 1.69680$   $\nu_1 = 55.53$
$r_2 = 5.7662$
  $d_2 = 1.4033$
$r_3 = 6.1102$
  $d_3 = 1.2293$   $n_2 = 1.84666$   $\nu_3 = 23.78$
$r_4 = 7.3191$
  $d_4 = D_1$ (variable)
$r_5 = \infty$ (stop)
  $d_5 = 0.5000$
$r_6 = 10.7147$
  $d_6 = 1.2317$   $n_3 = 1.77250$   $\nu_3 = 49.60$
$r_7 = -202.6535$
  $d_7 = 2.7200$
$r_8 = 15.4248$
  $d_8 = 1.6245$   $n_4 = 1.88300$   $\nu_4 = 40.76$
$r_9 = -7.0963$
  $d_9 = 0.1988$
$r_{10} = -6.0819$
  $d_{10} = 0.8000$   $n_5 = 1.84666$   $\nu_5 = 23.78$
$r_{11} = 59.2972$
  $d_{11} = D_2$ (variable)
$r_{12} = 15.5725$
  $d_{12} = 0.8000$   $n_6 = 1.54814$   $\nu_6 = 45.78$
$r_{13} = 5.7769$
  $d_{13} = D_3$ (variable)
$r_{14} = 13.2623$
  $d_{14} = 1.9556$   $n_7 = 1.88300$   $\nu_7 = 40.76$
$r_{15} = -40.0039$
  $d_{15} = 0.1998$
$r_{16} = \infty$
  $d_{16} = 1.6000$   $n_8 = 1.51633$   $\nu_8 = 64.14$
$r_{17} = \infty$
  $d_{17} = 1.6000$   $n_9 = 1.51633$   $\nu_9 = 64.14$
$r_{18} = \infty$
  $d_{18} = 0.4000$
$r_{19} = \infty$
  $d_{19} = 0.7500$   $n_{10} = 1.51633$   $\nu_{10} = 64.14$
$r_{20} = \infty$
  $d_{20} = 1.1663$
$r_{21} = \infty$ (image)

| f | 6.55 | 11 | 19.46 |
|---|---|---|---|
| $D_1$ | 11.53674 | 5.96880 | 0.50000 |
| $D_2$ | 2.09559 | 2.70333 | 7.71887 |
| $D_3$ | 2.60453 | 7.57840 | 8.04678 |

Embodiment 9

$f = 7.52$, F number = 2.9, $2\omega = 59°$
$r_1 = \infty$ (stop)
  $d_1 = 0.5000$
$r_2 = -4.2544$
  $d_2 = 3.3444$   $n_1$ (gradient index lens element)
$r_3 = -8.1332$
  $d_3 = 3.0948$
$r_4 = 10.1395$
  $d_4 = 3.9600$   $n_2 = 1.80610$   $\nu_2 = 40.92$
$r_5 = -4.6038$
  $d_5 = 0.7983$   $n_3 = 1.84666$   $\nu_3 = 23.78$ -continued $r_6 = -25.3258$
$d_6 = 2.4766$
$r_7 = \infty$
$d_7 = 1.6000$  $n_4 = 1.51633$  $\nu_4 = 64.14$
$r_8 = \infty$
$d_8 = 1.6000$  $n_5 = 1.51633$  $\nu_5 = 64.14$
$r_9 = \infty$
$d_9 = 0.5000$
$r_{10} = \infty$
$d_{10} = 0.7500$  $n_6 = 1.48749$  $\nu_6 = 70.23$
$r_{11} = \infty$
$d_{11} = 1.1912$
$r_{12} = \infty$ (image)
gradient index lens element

| wavelength | $N_0$ | $N_1$ |
|---|---|---|
| d line | 1.65000 | $-9.2600 \times 10^{-3}$ |
| C line | 1.64487 | $-9.2558 \times 10^{-3}$ |
| F line | 1.66197 | $-9.2699 \times 10^{-3}$ |

Embodiment 10

$r_1 = \infty$ (stop)
$d_1 = 15.0000$  $n_1$ (gradient index lens element)
$r_2 = \infty$
$d_2 = 0.0925$
$r_3 = \infty$ (image)
gradient index lens element

| wavelength | $N_0$ | $N_1$ |
|---|---|---|
| d line | 1.67800 | $-9.0245 \times 10^{-3}$ |
| C line | 1.67265 | $-9.0959 \times 10^{-3}$ |
| F iine | 1.69049 | $-8.8577 \times 10^{-3}$ |

Embodiment 11

$f = 4.89{\sim}8.63{\sim}20.4$, F number = $3.2{\sim}4.1{\sim}6.6$
$2\omega = 76.6°{\sim}44.4°{\sim}19.2°$
$r_1 = 17.8104$
$d_1 = 2.6456$  $n_1 = 1.74100$  $\nu_1 = 52.64$
$r_2 = 6.7693$
$d_2 = 2.5884$
$r_3 = 330.8548$
$d_3 = 0.8000$  $n_2 = 1.60300$  $\nu_2 = 65.44$
$r_4 = 8.6751$
$d_4 = 0.7126$
$r_5 = 8.4625$
$d_5 = 1.6000$  $n_3 = 1.84666$  $\nu_3 = 23.78$
$r_6 = 16.3699$
$d_6 = D_1$ (variable)
$r_7 = \infty$ (stop)
$d_7 = 0.5000$
$r_8 = \infty$
$d_8 = 5.4448$  $n_4$ (gradient index lens element)
$r_9 = -40.2775$
$d_9 = D_2$ (variable)
$r_{10} = 7.1860$
$d_{10} = 2.8854$  $n_5 = 1.78472$  $\nu_5 = 25.68$
$r_{11} = 4.5503$
$d_{11} = D_3$ (variable)
$r_{12} = 29.4393$
$d_{12} = 2.0000$  $n_6 = 1.69680$  $\nu_6 = 55.53$
$r_{13} = -12.3722$
$d_{13} = 0.2000$
$r_{14} = \infty$
$d_{14} = 1.6000$  $n_7 = 1.51633$  $\nu_7 = 64.14$
$r_{15} = \infty$
$d_{15} = 1.6000$  $n_8 = 1.51633$  $\nu_8 = 64.14$
$r_{16} = \infty$
$d_{16} = 0.4000$
$r_{17} = \infty$
$d_{17} = 0.7500$  $n_9 = 1.51633$  $\nu_9 = 64.14$
$r_{18} = \infty$
$d_{18} = 1.1493$
$r_{19} = \infty$ (image)

| f | 4.89 | 8.63 | 20.4 |
|---|---|---|---|
| $D_1$ | 17.65743 | 8.86991 | 1.00000 |
| $D_2$ | 4.75469 | 6.19762 | 16.16667 |
| $D_3$ | 2.00000 | 5.65005 | 9.32004 | gradient index lens element

| wavelength | $N_0$ | $N_1$ | $N_2$ |
|---|---|---|---|
| d line | 1.70000 | $-6.2418 \times 10^{-3}$ | $-1.1880 \times 10^{-5}$ |
| C line | 1.69475 | $-6.2588 \times 10^{-3}$ | $-1.1912 \times 10^{-5}$ |
| F line | 1.71225 | $-6.2021 \times 10^{-3}$ | $-1.1804 \times 10^{-5}$ |
| g line | 1.72241 | $-6.1441 \times 10^{-3}$ | $-1.1589 \times 10^{-5}$ | wherein the reference symbols $r_1, r_2, \ldots$ represent radii of curvature on surfaces of respective lens elements, the reference symbols d1, d2, . . . designate thicknesses of the respective lens elements and airspaces reserved therebetween, the reference symbols $n_1, n_2, \ldots$ denote refractive indices of the respective lens elements, and the reference symbols $\nu_1/\nu_2, \ldots$ represent Abbe's numbers of the respective lens elements.

The first embodiment is a zoom optical system which has a composition illustrated in FIG. 1, or is composed, in order from the object side, of a first lens unit having a negative refractive power, a second lens unit having a positive refractive power, a third lens unit having a negative refractive power and a fourth lens unit having a positive refractive power. Plane parallel plates disposed after the fourth lens unit represent filters such as a low pass filter and an infrared filter, and a cover glass plate of an image pickup device.

In the first embodiment, the first lens unit is kept stationary during change of a magnification, and has a function to lead an axial ray and off-axial rays to the second lens unit, the second lens unit is movable for changing the magnification and has a main vari-focal function, the third lens unit is movable for changing the magnification and has a main function to correct a deviation caused by changing the magnification, and the fourth lens unit is kept stationary during the change of the magnification and has a function to image a light bundle coming from the third lens unit.

As understood from the foregoing description, the first embodiment is a zoom optical system which consists of the four negative, positive, negative and positive lens units, and can be in a compact configuration at a low cost by using a radial type gradient index lens element. Though the first embodiment is compact, it is capable of correcting aberrations owing to a radial type gradient index lens element used in the second lens unit having the vari-focal function for strengthening a refractive power of this lens unit. Use of the radial type gradient index lens element makes it possible to compose the second lens unit of a single lens element and manufacture the optical system at a low cost.

Further, the optical system according to the present invention can be focused on an object located at an extremely short distance by moving the third lens unit which is a negative lens element along an optical axis. The optical system can be focused also by moving the first lens unit along the optical axis.

For favorably correcting mainly off-axial aberrations such as lateral chromatic aberration and distortion, the first lens unit is composed, in order from the object side, of a negative lens element and a positive lens element. Further, it is possible by keeping the first lens unit stationary during the change of the magnification to configure a lens barrel so as to enhance its strength to external impact and pressure.

Furthermore, it is possible to suppress aberrations caused by changing the magnification by keeping the lens unit disposed on the image side (the fourth lens unit) stationary during the change of the magnification.

In the optical system preferred as the first embodiment, a stop is disposed on the object side of the second lens unit and moved together with the second lens unit for changing the magnification, thereby reducing variations of aberrations caused by the change of the magnification. Owing to the fact that the radial type gradient index lens element used as the second lens unit is moved together with the stop, the radial type gradient index lens element can have a small diameter and the optical system can be manufactured at a low cost. Further, the third lens unit and the fourth lens unit which are disposed on the image side of the radial type gradient index lens element are composed of a negative lens element and a positive lens element respectively. That is, disposed on the object side of the radial type gradient index lens element are a negative lens element and a positive lens element in order from the object side so that the optical system can be composed of a small number of lens elements. In other words, a triplet type lens system is composed a positive lens element, a negative lens element and a positive lens element on the image side of the first lens unit which has a function to widen a field angle so that aberrations can be corrected effectively with a small number of lens elements. Owing to the fact that the positive lens element is disposed on the image side, it is possible to allow off-axial rays to be incident on an image surface nearly in parallel with the optical axis. Furthermore, all the lens elements other than the gradient index lens element are homogeneous spherical lens elements so as to reduce adverse influence due to eccentricity of the optical system and allow the optical system to be manufactured at a low cost. Moreover, the radial type gradient index lens element has two planar surfaces so that the optical system can be manufactured at a low cost.

Figure 2:
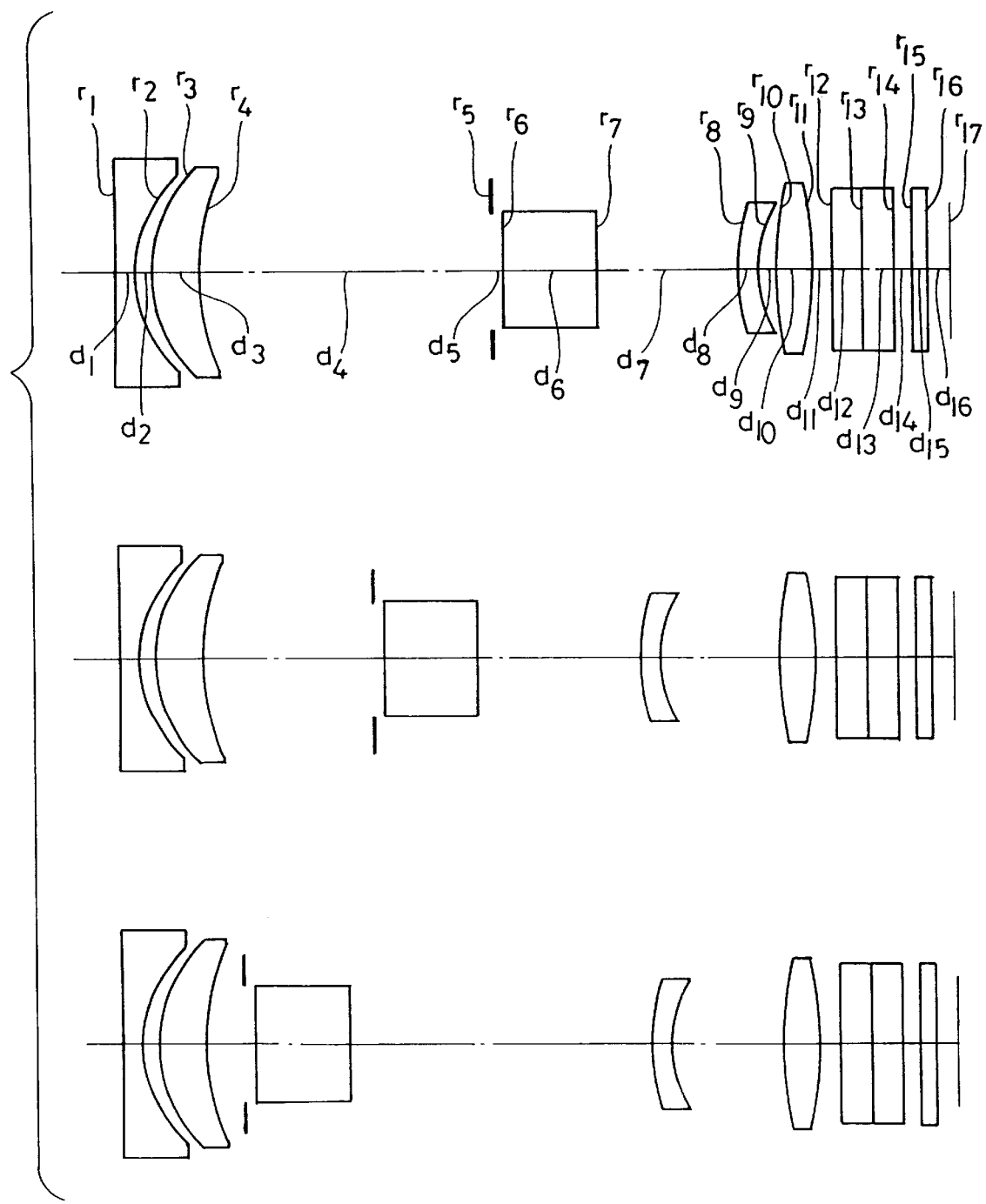

The second embodiment is a zoom optical system which has a composition illustrated in FIG. 2, or is composed, in order from the object side, of a first lens unit which is kept stationary during a change of a magnification and has a negative refractive power, a second lens unit which is movable for changing the magnification and has a positive refractive power, a third lens unit which is movable for the change of the magnification and has a negative refractive power, and a fourth lens unit which is kept stationary during the change of the magnification and has a positive refractive power. A radial type gradient index lens element is used in the second lens unit. In other words, the second embodiment is an optical system which is composed of four lens units, negative, positive, negative and positive in that order from the object side, and can be configured compactly at a low cost by using a radial type gradient index lens element.

Though the lens units of the second embodiment have functions which are substantially the same as those of the lens elements of the first embodiment, the second embodiment has an F number which is smaller than that of the first embodiment and is configured as a brighter optical system. Though the second lens unit therefore tends to produce spherical aberration in a large amount, spherical aberration is corrected favorably by using the radial type gradient index lens element in the second lens unit. Though the second lens unit which has the positive refractive power tends to remarkable negative spherical aberration, spherical aberration is corrected favorably by selecting a positive value for the distribution coefficient $N_{2\lambda}$ of the fourth order of the gradient index lens element so that it produces positive spherical aberration.

Figure 3:
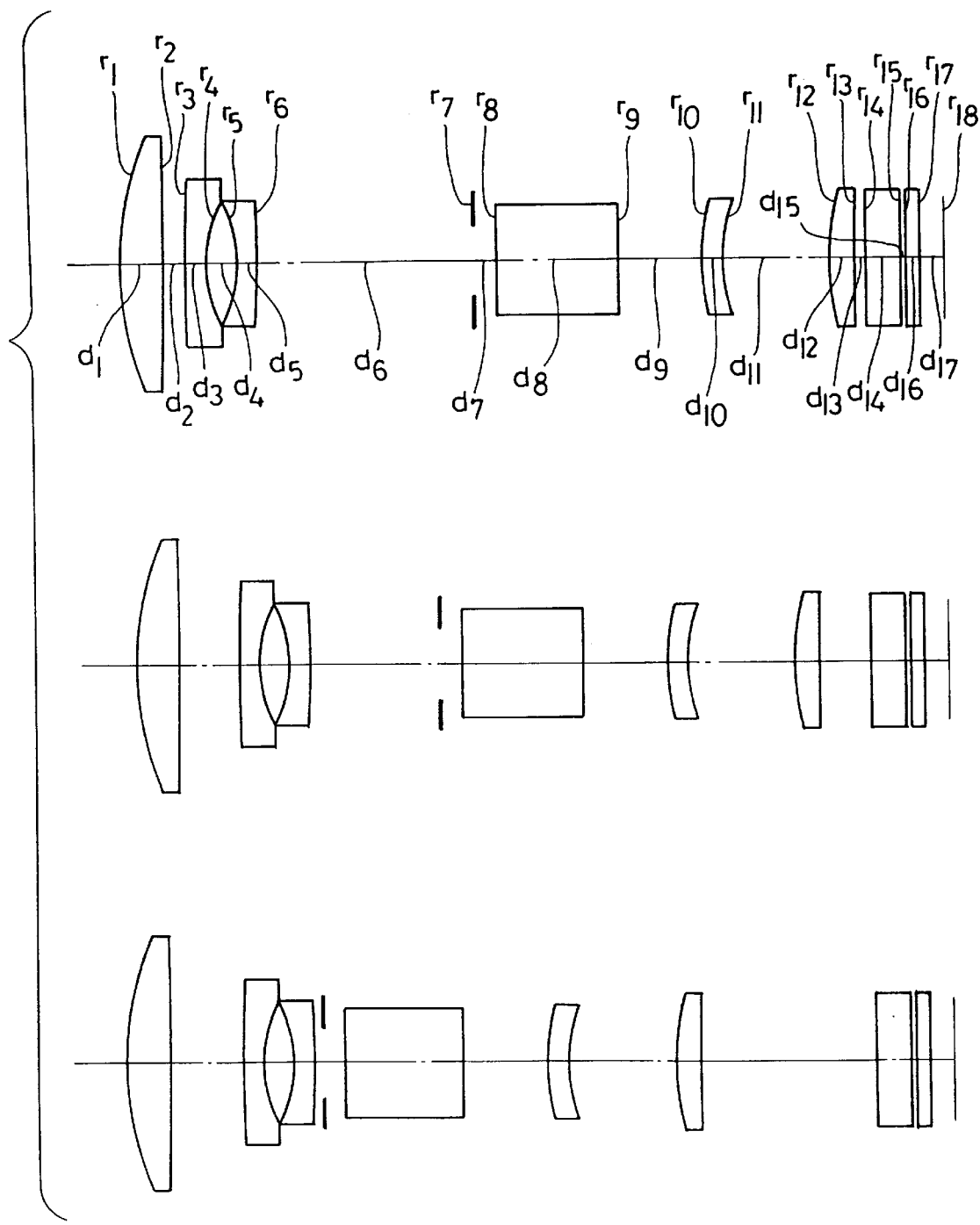

The third embodiment is a zoom optical system which has a composition illustrated in FIG. 3, or is composed, in order from the object side, of a first lens unit having a positive refractive power, a second lens unit having a negative refractive power and a third lens unit having a positive refractive power.

The first lens unit is kept stationary during a change of a magnification and has a function to lead an axial light bundle and an off-axial light bundle to the second lens unit, whereas the second and third lens units are movable for changing the magnification, and have a vari-focal function and another function to vary an airspace reserved between these lens units for correcting a deviation of an image surface which is caused by changing the magnification.

The third embodiment is a zoom optical system which consists of the three positive, negative and positive lens units, and is made compact at a low cost by using a radial type gradient index lens element.

The third embodiment is a zoom optical system which comprises a positive lens unit disposed on the object side. It is made compact by using the radial type gradient index lens element in the third lens unit which mainly has the vari-focal function, thereby strengthening the refractive power of this lens unit and corrects aberrations favorably in spite of the strengthened refractive power. The first lens unit is composed of a single positive lens element, the second lens unit is composed of two negative lens elements and the third lens unit is composed of three positive, negative and positive lens elements: the lens element disposed on the object side in the third lens unit being configured as the radial type gradient index lens element. A stop is disposed on the object side of the third lens unit and moved together with the third lens unit so as to lower a manufacturing cost by reducing a diameter of the radial type gradient index lens element. The third embodiment is configured to be focused on an object located at an extremely short distance by moving the negative lens element in the third lens unit along an optical axis. The third embodiment can be focused also by moving the positive lens element which is disposed on the object side in the third lens unit. The third embodiment is configured as an optical system which is composed of a small number of lens elements and has favorable optical performance by disposing, in order from the object side, the negative lens element and the positive lens element on the image side of the radial type gradient index lens element in the third lens unit. All the lens elements other than the radial type gradient index lens element are homogeneous spherical lens elements so as to reduce influences due to eccentricities and lower manufacturing cost. Furthermore, the radial type gradient index lens element has two planar surfaces so that it can be manufactured at a low cost.

Figure 4:
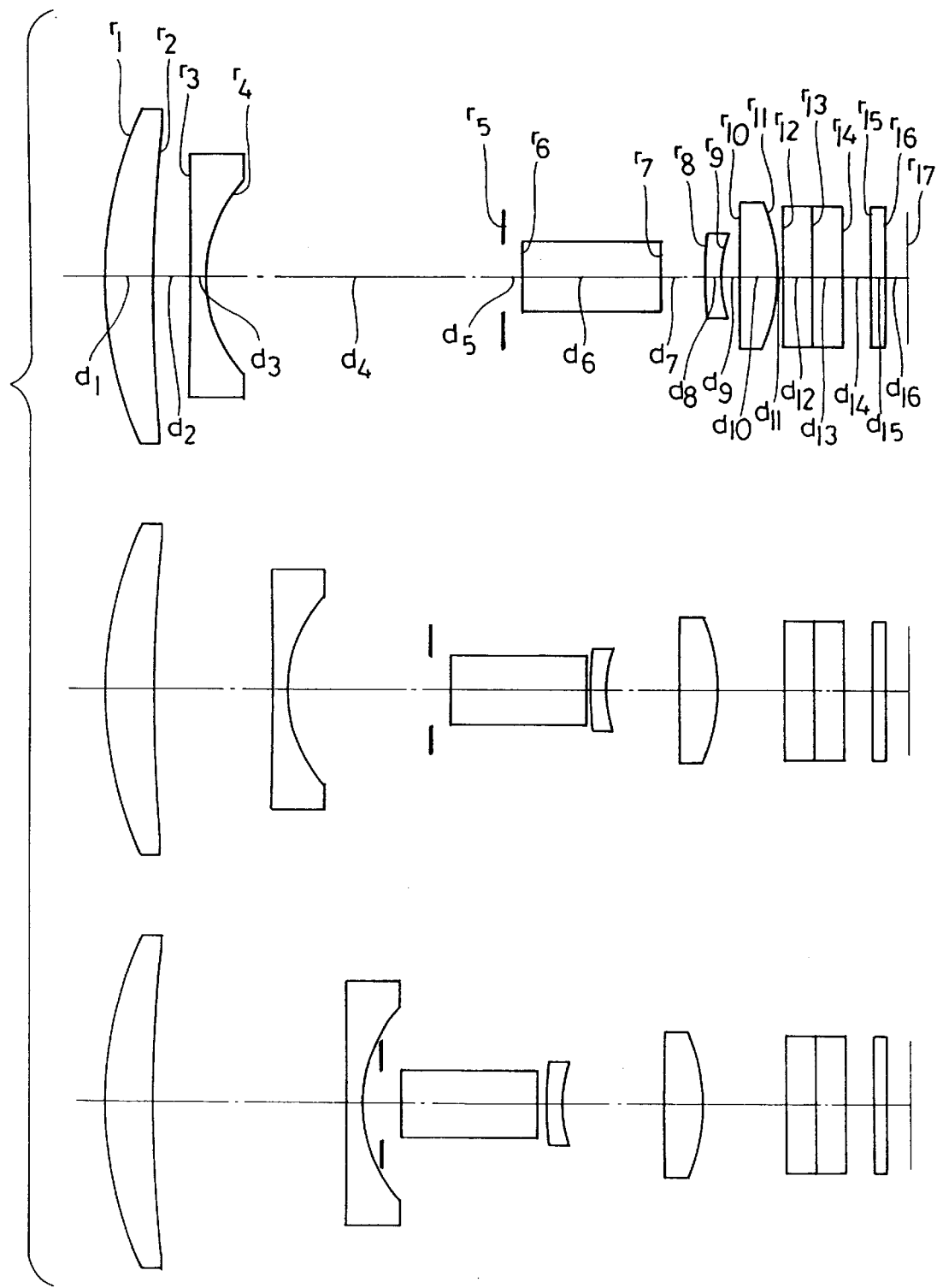

The fourth embodiment is an optical system having a composition illustrated in FIG. 4, or is a zoom optical system which is composed, in order from the object side, of a first lens unit having a positive refractive power, a second lens unit having a negative refractive power, a third lens unit having a positive refractive power, a fourth lens unit having a negative refractive power and a fifth lens unit having a positive refractive power.

In this optical system, the first lens unit is kept stationary during a change of a magnification and leads an axial light bundle and an off-axial light bundle to the second lens unit, the second and third lens units are movable for changing the magnification and mainly have a vari-focal function, the fourth lens unit mainly corrects deviation caused due to the change of the magnification, and the fifth lens unit has the function of imaging a light bundle coming from the fourth lens unit onto an image surface. The fourth embodiment is an example of zoom optical system which consists of five positive, negative, positive, negative and positive lens elements, and is configured compactly at a low cost by using a radial type gradient index lens element in the optical system.

Though the fourth embodiment is a zoom optical system which comprises a positive lens unit disposed on the object side, it is configured compactly by using a radial type gradient index lens element in a third lens unit which mainly has a vari-focal function, thereby strengthening the refractive power of this lens unit and correcting aberrations favorably in spite of the strengthened refractive power of the third lens unit. Further, each of the lens units is composed of a single lens element.

Further, a stop is disposed on the object side of the third lens unit and moved together with the third lens unit so as to reduce variations of aberrations caused by a change of a magnification. The movement of the stop together with the third lens unit permits reducing a diameter of the radial type gradient index lens element and lower a manufacturing cost. Furthermore, the fourth lens unit is composed of a single negative lens element and the fifth lens unit is composed of a single positive lens element disposed on the image side of the radial type gradient index lens element or a negative lens element and a positive lens element disposed on the image side of the radial type gradient index lens element, thereby configuring the optical system compact.

The optical system preferred as the fourth embodiment is configured to be focused on an object located at an extremely short distance by moving the fourth lens unit along an optical axis. The fourth embodiment can be focused on an object located at an extremely short distance also by moving the positive lens element of the fifth lens unit. All the lens elements other than the radial type gradient index lens element are homogeneous spherical lens elements, whereby the optical system is scarcely influenced by eccentricities and can therefore be manufactured at a low cost. Furthermore, the radial type gradient index lens element has two planar surfaces, thereby also serving for reduction of manufacturing cost.

Figure 5:
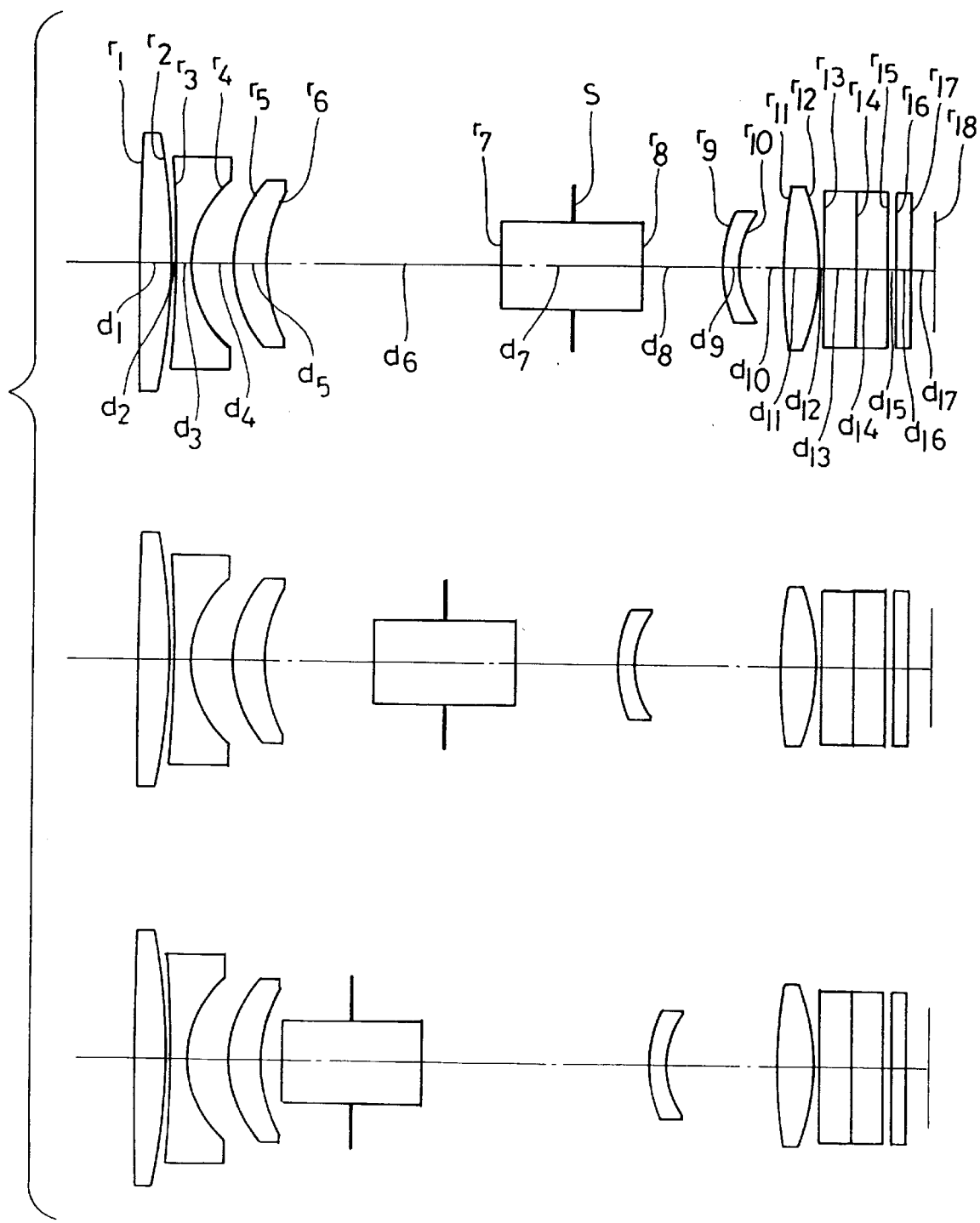

The fifth embodiment is an optical system having a composition illustrated in FIG. 5, or is a zoom optical system which is composed, in order from the object side, of a first lens unit having a negative refractive power, a second lens unit having a positive refractive power, a third lens unit having a negative refractive power and a fourth lens unit having a positive refractive power.

In this optical system, the first lens unit is kept stationary during a change of a magnification and leads an axial light bundle and an off-axial light bundle to the second lens unit, the second lens unit is movable for changing the magnification and mainly has a vari-focal function, the third lens unit is movable for changing the magnification and mainly functions to correct a deviation of an image surface caused by changing the magnification, and the fourth lens unit is kept stationary during the change of the magnification and images a light bundle coming from the third lens unit. The fifth embodiment is a zoom optical system which is composed of four negative, positive, negative and positive lens units, and configured compactly by using a radial type gradient index lens element in the optical system.

The fifth embodiment is configured as an optical system having a field angle which is made wider than that of the first embodiment by composing the first lens unit of three lens elements. Further, the optical system is configured compactly and aberrations are corrected favorably by using the radial type gradient index lens element in the second lens unit which has the vari-focal function so as to strengthen the refractive power of the second lens unit. Furthermore, the use of the gradient index lens element makes it possible to compose the second lens unit of a single lens element.

For correcting off-axial aberrations such as chromatic aberration and distortion, the first lens unit is composed, in order from the object side, of a positive lens element, a negative lens element and a positive lens element. An aperture stop is imaginarily disposed nearly in the middle of the radial type gradient index lens element which is the second lens unit, whereby the aperture stop is moved together with the second lens unit and variations of aberrations can be small during the change of the magnification. Since the aperture stop is moved together with the second lens unit, it is possible to lower the cost of the optical system by reducing a diameter of the radial type gradient index lens element. In FIG. 5, a reference symbol S represents the imaginary aperture stop.

When an aperture stop is imaginarily disposed in a radial type as described above, it is desirable to dispose actual stop mechanisms on both the object side and the image side of the gradient index lens element. By disposing stop mechanisms as described above, it is possible to narrow a light bundle uniformly, reduce ununiformities within a screen and enhance resolution by narrowing the light bundle.

Figure 13A:
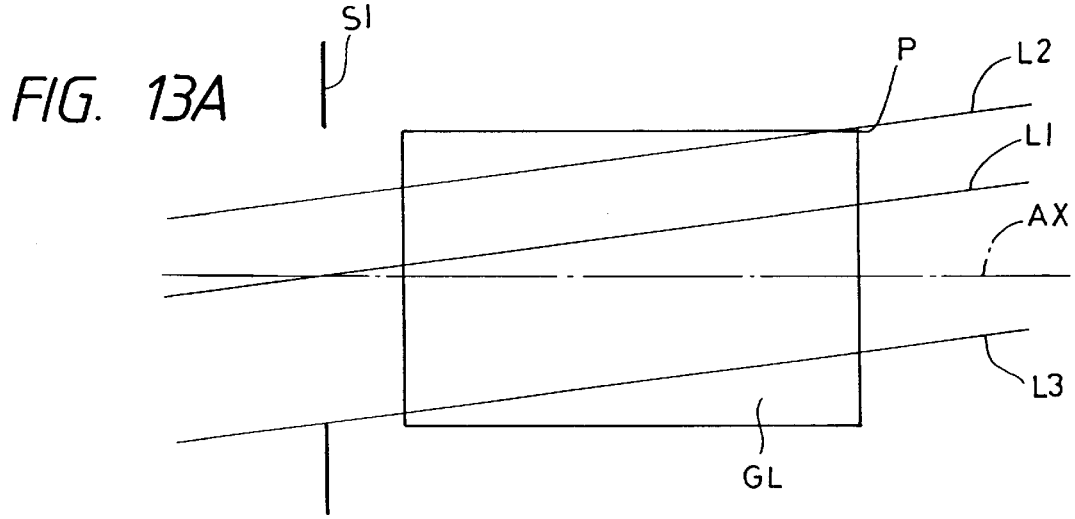
FIGS. 13A, 13B and 13C show diagrams illustrating conditions of rays when stops are disposed before and after a gradient index lens element.
Figure 13B:
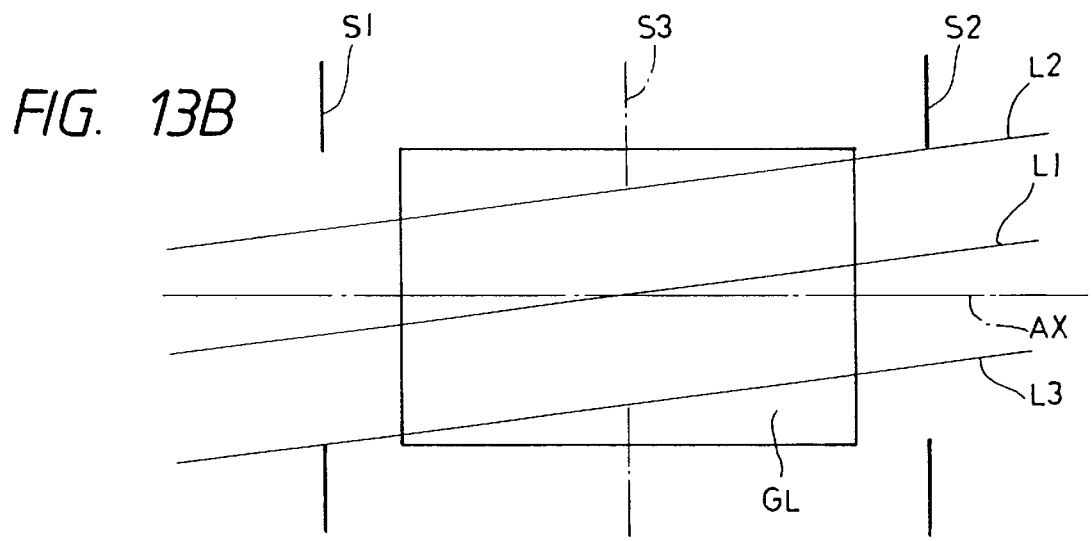
Figure 13C:
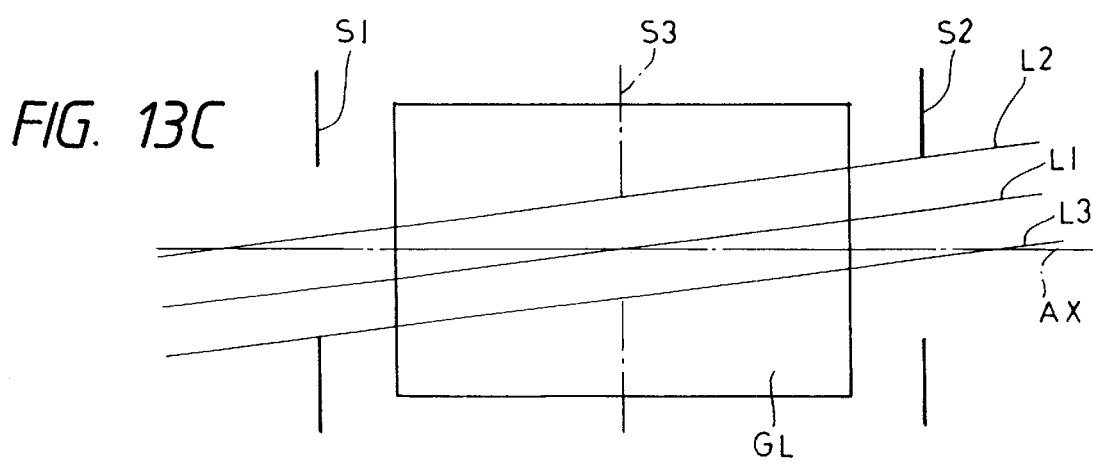

FIGS. 13A, 13B and 13C are diagrams illustrating conditions of a light bundle obtainable by disposing stop mechanisms on both sides of a gradient index lens element. In the drawing, a reference symbol GL represents the gradient index lens element, a reference symbol AX designates an optical axis, a reference symbol $L_1$ denotes an off-axial principal ray, a reference symbol $L_2$ represents an upper subordinate ray, a reference symbol $L_3$ designates a lower subordinate ray, a reference symbol $S_1$ denotes a stop mechanism on the object side, a reference symbol $S_2$ represents a stop mechanism on the image side and a reference symbol $S_3$ designates the imaginary stop.

FIG. 13A shows a case wherein the stop mechanism $S_1$ is disposed on the object side of the gradient index lens element. In this case, the upper subordinate ray $L_2$ and the lower subordinate ray $L_3$ of the light bundle are asymmetrical with regard to the principal ray $L_1$ since the upper subordinate ray $L_2$ is limited at a point P of the lens element GL. Accordingly, the lower subordinate ray $L_3$ is narrowed first and the rays are narrowed asymmetrically by stopping down the stop mechanism $S_1$. Since the rays are narrowed at degrees which are variable dependently on field angles, variations in brightness and resolution are produced on a screen by stopping down the stop mechanism $S_1$. In order to reduce these variations, it is desirable to adopt a configuration wherein stop mechanisms are disposed on both sides of the gradient index lens element GL so as to form an imaginary aperture stop is formed in the lens element as shown in FIG. 13B. In this composition, the upper subordinate ray $L_2$ is limited by the stop mechanism $S_2$ and the lower subordinate ray $L_3$ is limited by the stop mechanism $S_1$. When the two stop mechanisms $S_1$ and $S_2$ are stopped down, the upper subordinate ray and the lower subordinate ray are narrowed symmetrically with regard to the principal ray $L_1$ as if the imaginary stop $S_3$ were stopped down in the gradient index lens element.

For the reason described above, it is desirable to dispose stop mechanisms on the object side and the image side of an optical system such as the fifth embodiment which comprises an imaginary stop in a lens element.

Figure 6:
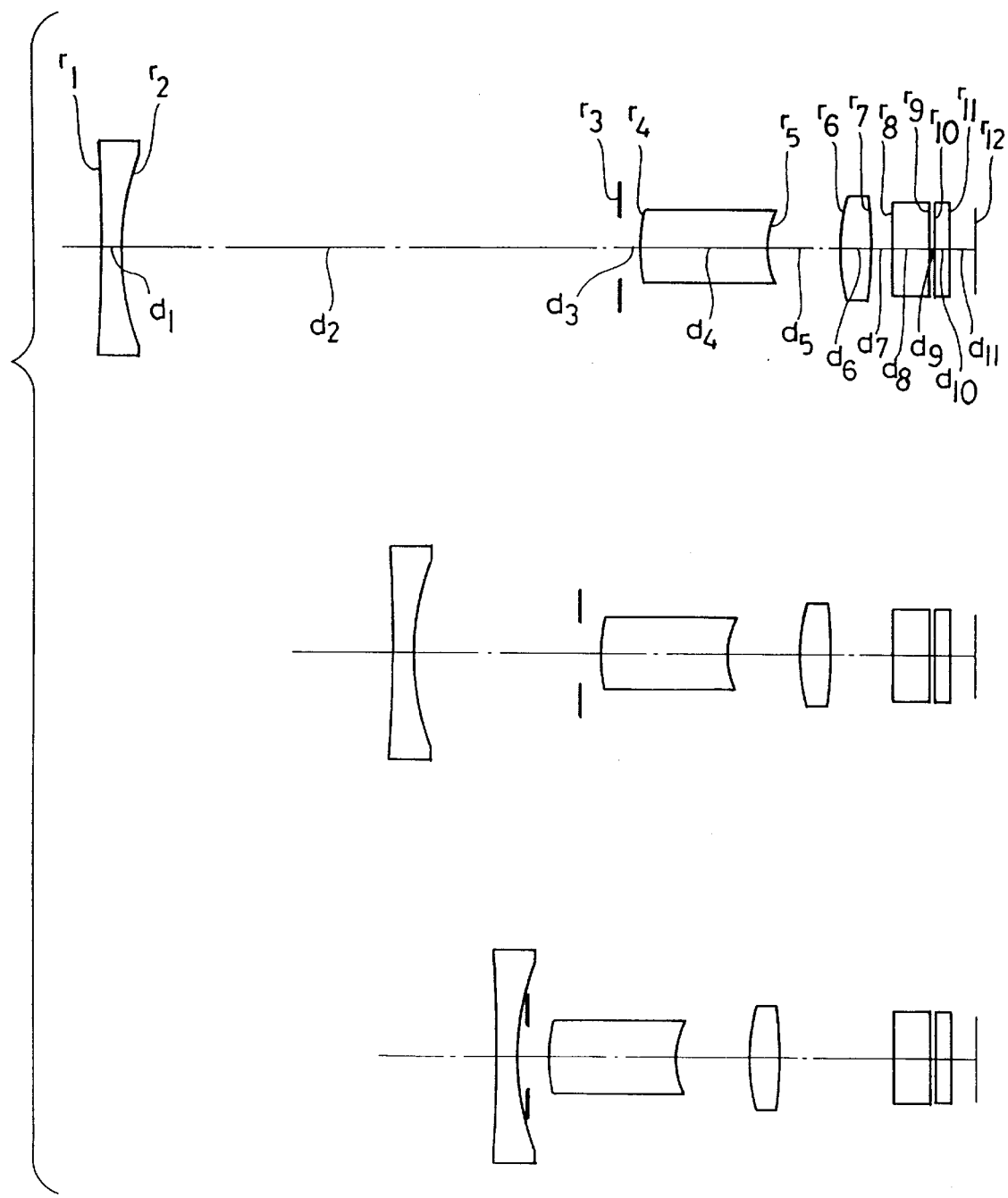

The sixth embodiment has a composition illustrated in FIG. 6, or is a zoom optical system which is composed, in order from the object side, of a first lens unit having a negative refractive power and a second lens unit having a positive refractive power. Both the first lens unit and the second lens unit are movable for changing the magnification and to correct a deviation of an image surface by varying an airspace reserved between both the lens units. Though the sixth embodiment is a zoom optical system which is composed of the two negative and positive lens units, it can be configured compactly and manufactured at a low cost. Though the negative lens unit is disposed on the object side in the sixth embodiment, it is configured compactly and corrects aberrations favorably by using the radial type gradient index lens element in the second lens unit which mainly has the vari-focal function.

Further, an aperture stop is disposed on the object side of the second lens unit and moved together with the second lens unit so as to reduce variations of aberrations during the change of the magnification. Since the aperture stop is moved together with the radial type gradient index lens element, it is possible to reduce a diameter of this gradient index lens element and lower the manufacturing cost. In other words, the sixth embodiment is configured to compose the optical system of a small number of lens elements by disposing a positive lens element on the image side of the gradient index lens element, or composing the second lens unit of the radial type gradient index lens element and a positive lens element. Further, all the lens elements other than the gradient index lens element are configured as homogeneous spherical lens elements so that the optical system is scarcely influenced by eccentricities and can be manufactured at a low cost.

The radial type gradient index lens element has a shape of a negative lens element for correcting a Petzval's sum and chromatic aberration in particular, and its image side surface is configured as a concave surface to prolong a back focal length.

The sixth embodiment is configured to be focused on an object located at an extremely short distance by moving the positive lens element disposed on the image side in the second lens unit.

Figure 7:
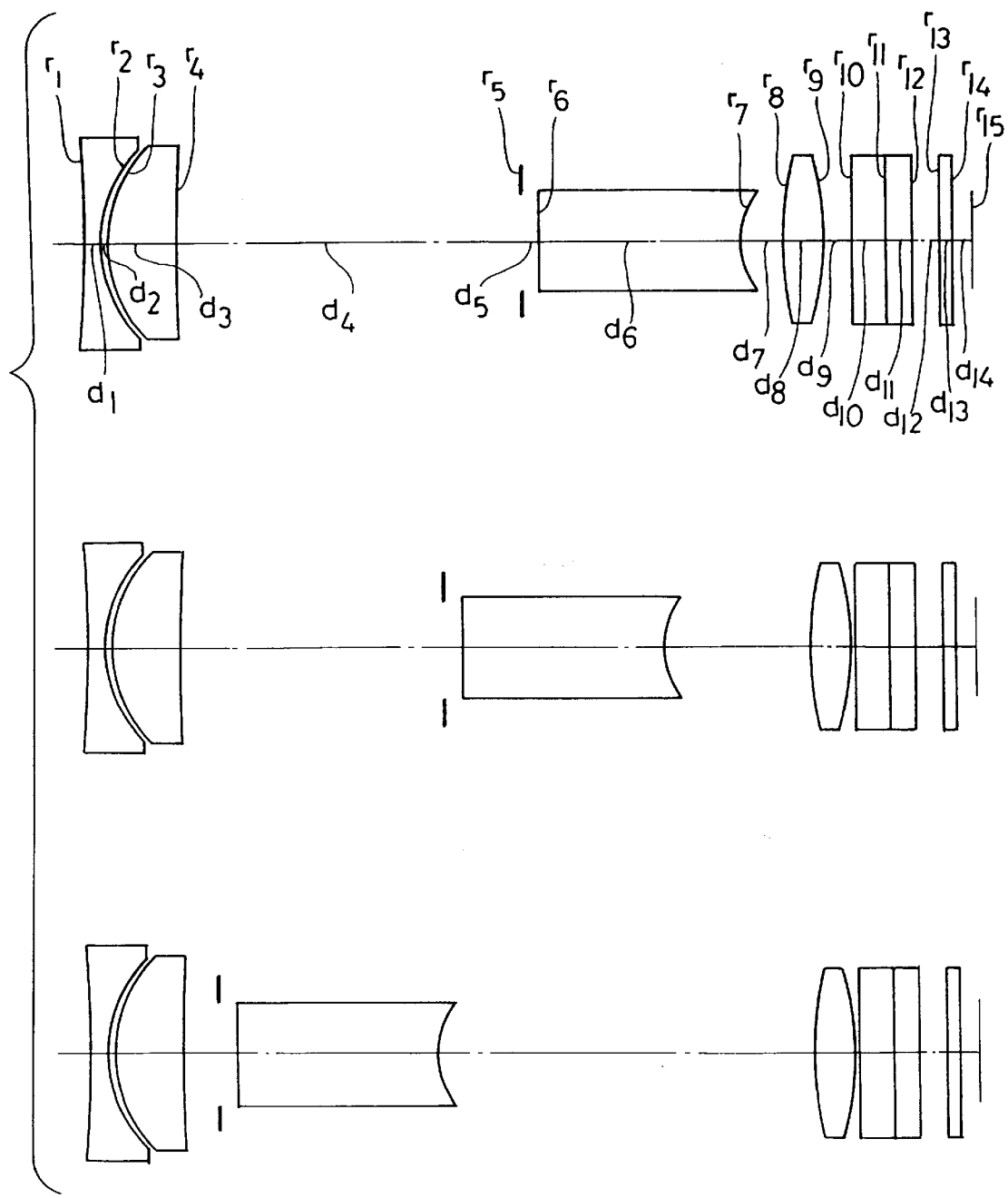

The seventh embodiment has a composition illustrated in FIG. 7, or is a zoom optical system which is composed, in order from the object side, of three lens units; a first lens unit having a negative refractive power, a second lens unit having a positive refractive power and a third lens unit having a positive refractive power.

In the seventh embodiment, the first lens unit is kept stationary during a change of a magnification and leads an axial light bundle and an off-axial light bundle to the second lens unit, the second lens unit is movable for changing the magnification and mainly has a vari-focal function, and the third lens unit has a function mainly to correct a deviation of an image surface caused by changing the magnification. The seventh embodiment is a zoom optical system which is composed of the three negative, positive and positive lens units, and can be configured compactly and manufactured at a low cost by using the radial type gradient index lens element in the optical system.

The seventh embodiment is capable of correcting aberrations favorably though it is a zoom optical system which comprises a negative lens unit disposed on the image side and is configured compactly by using the radial type gradient index lens element in the second lens unit which mainly has the vari-focal function so as to strengthen a refractive power of this lens unit. Since an aperture stop is disposed on the object side of the gradient index lens element which is the second lens unit and movable together with the second lens unit, it is possible to reduce variations of aberrations during the change of the magnification, reduce a diameter of the radial type gradient index lens element and manufacture the optical system compactly. Further, a lens component which is disposed on the image side of the gradient index lens element, i.e., the third lens unit, is composed of a single lens element, whereby the optical system as a whole is composed of a small number of lens elements. Furthermore, all the lens elements other than the gradient index lens element are configured as homogeneous lens elements, whereby the optical system is scarcely influenced by eccentricities and can be manufactured at a low cost. Moreover, one of surfaces of the radial type gradient index lens element is configured as a planar surface to lower a manufacturing cost.

The seventh embodiment is focused by moving the third lens unit along an optical axis.

Figure 8:
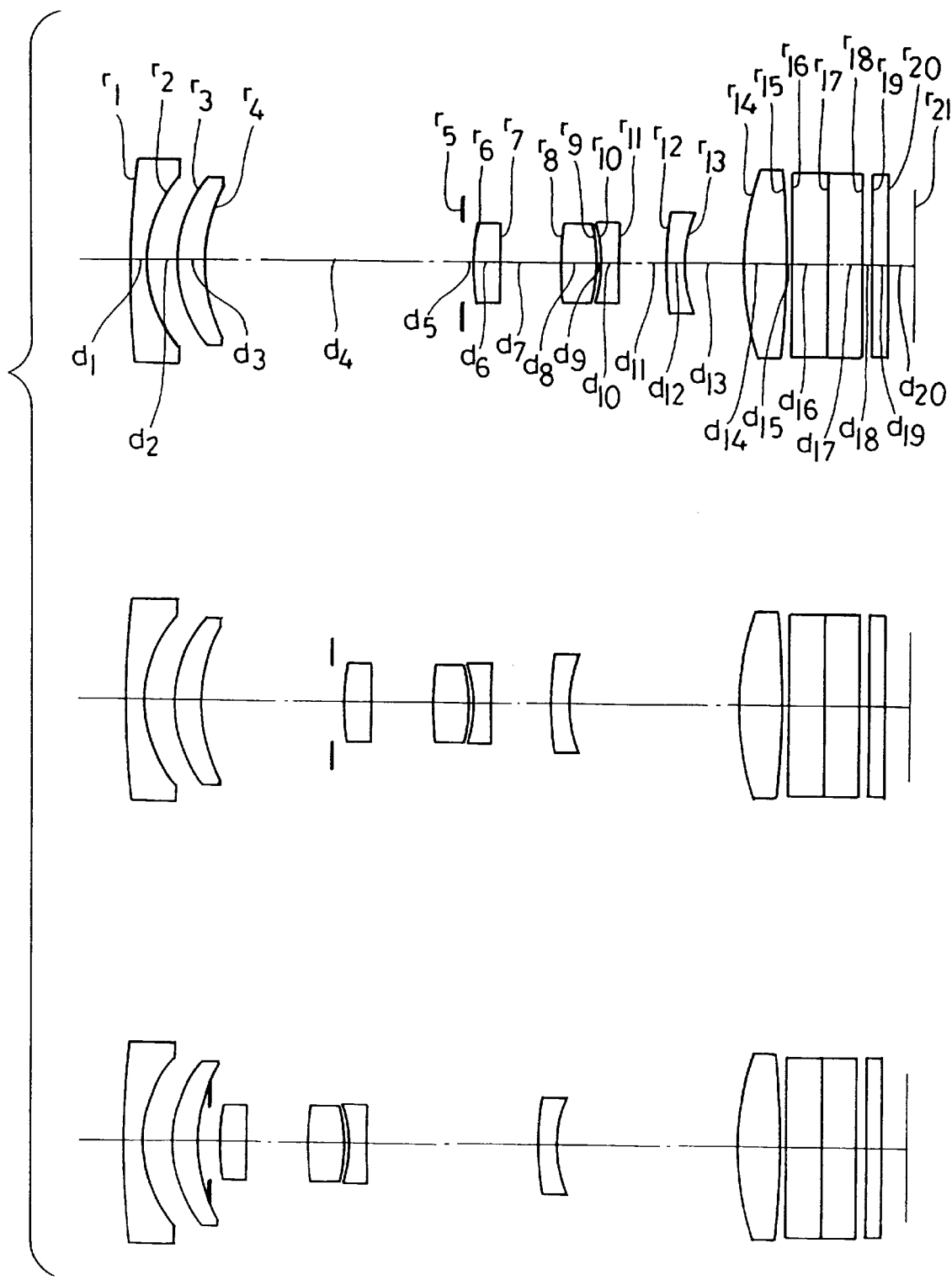

The eighth embodiment is a zoom optical system which is composed, in order from the object side as shown in FIG. 8, of a first lens unit having a negative refractive power, a second lens unit having a positive refractive power, a third lens unit having a negative refractive power and a fourth lens unit having a positive refractive power.

In the eighth embodiment, the first lens unit is kept stationary during a change of a magnification and leads an axial light bundle and an offaxial light bundle to the second lens unit, the second lens unit is movable for changing the magnification and mainly has a vari-focal function, the third lens unit is movable for changing the magnification and corrects a deviation caused by changing the magnification, and the fourth lens unit is kept stationary during the change of the magnification and has a function to image a light bundle coming from the third lens unit. That is, the eighth embodiment is a zoom optical system which is composed of the four negative, positive, negative and positive lens units like the first embodiment. Differently from the first embodiment, however, all the lens elements used in the eighth embodiment are homogeneous lens elements.

For favorably correcting mainly off-axial aberrations such as lateral chromatic aberration and distortion in the optical system, the first lens unit is composed, in order from the object side, of a negative lens element and a positive lens element. Since the first lens unit is kept stationary during the change of the magnification, a lens barrel can be configured so as to have an enhanced strength to external impact and pressure. Further, variations of aberrations caused by changing the magnification can be suppressed since the fourth lens unit which is disposed on the image side is kept stationary during the change of the magnification. Furthermore, an aperture stop which is disposed on the object side of the second lens unit and moved together with the second lens unit makes it possible to reduce variations of aberrations to be caused by changing the magnification.

The eighth embodiment is focused on an object located at an extremely short distance by moving the third lens unit along an optical axis. The eighth embodiment can be focused also by moving the first lens unit or the fourth lens unit along the optical axis. Further, the eighth embodiment can be focused by moving at least one lens element disposed in the second lens unit.

Figure 9:
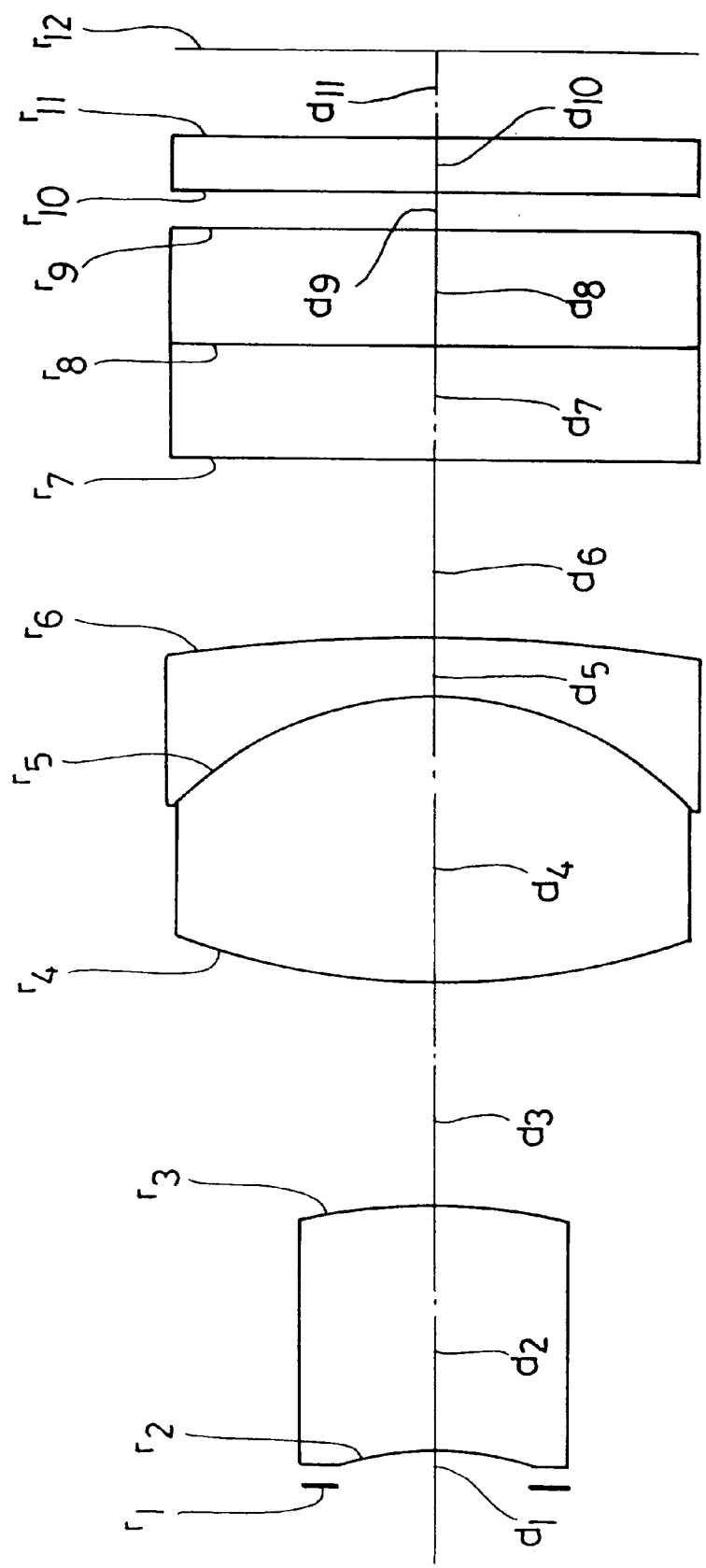

The ninth embodiment is an optical system which has a single focal point and is composed, in order from the object side as shown in FIG. 9, of a first lens unit having a positive refractive power and a second lens unit having a positive refractive power: the first lens unit being composed of a single radial type positive refractive index lens element, and the second lens unit being composed of a cemented lens component consisting of a negative lens element and a positive lens element. The ninth embodiment has high imaging performance though it is composed of a small number of lens elements, i.e., a radial type gradient index lens element and lens elements of a positive cemented lens component. An aperture stop is disposed on the object side.

The aperture stop is disposed in the vicinity of the radial type gradient index lens element for reducing a diameter of the radial type gradient index element, thereby lowering a manufacturing cost.

In the ninth embodiment, chromatic aberration and a Petzval's sum are favorably corrected by configuring the radial type gradient index lens element so as to have a shape of a negative lens element. Further, the radial type gradient index lens element has a meniscus shape having a concave surface on the object side for favorably correcting spherical aberration. The radial type gradient index lens element has the meniscus shape whose concave surface is located on the side of the aperture stop so that it is capable of favorably correcting off-axial aberrations such as coma in particular.

Figure 10A:
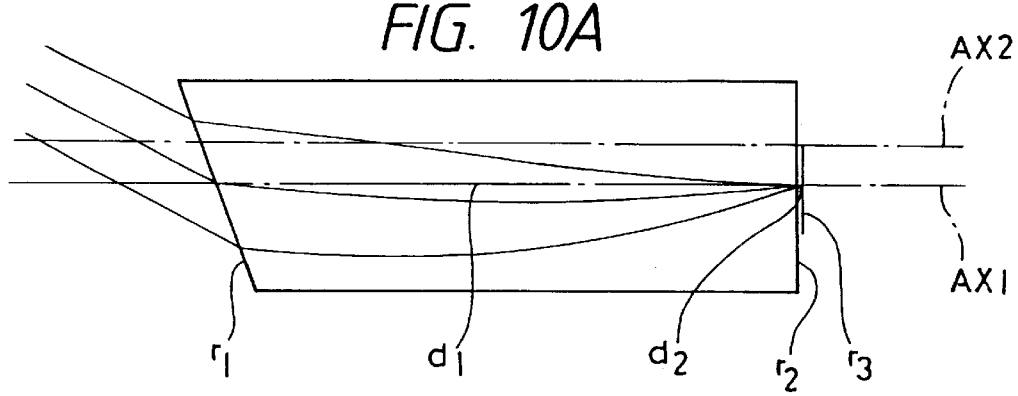
Figure 10B:
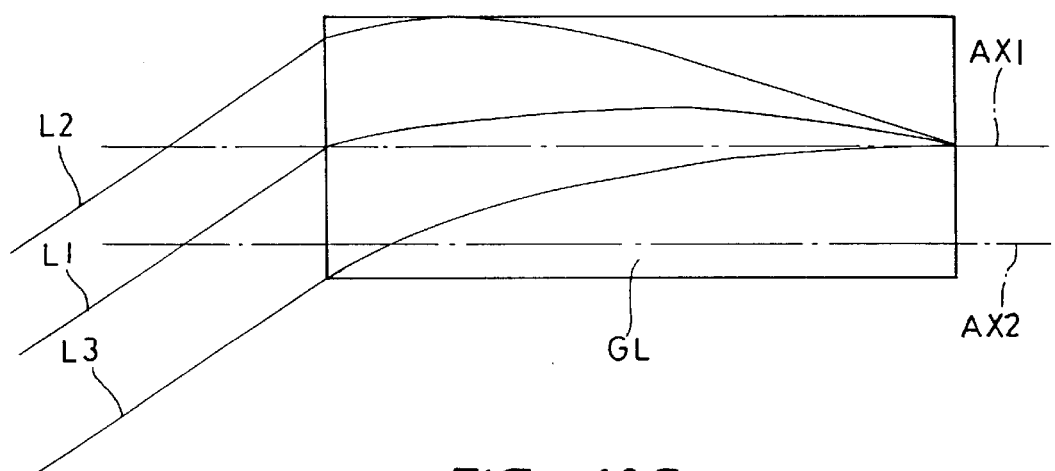
Figure 10C:
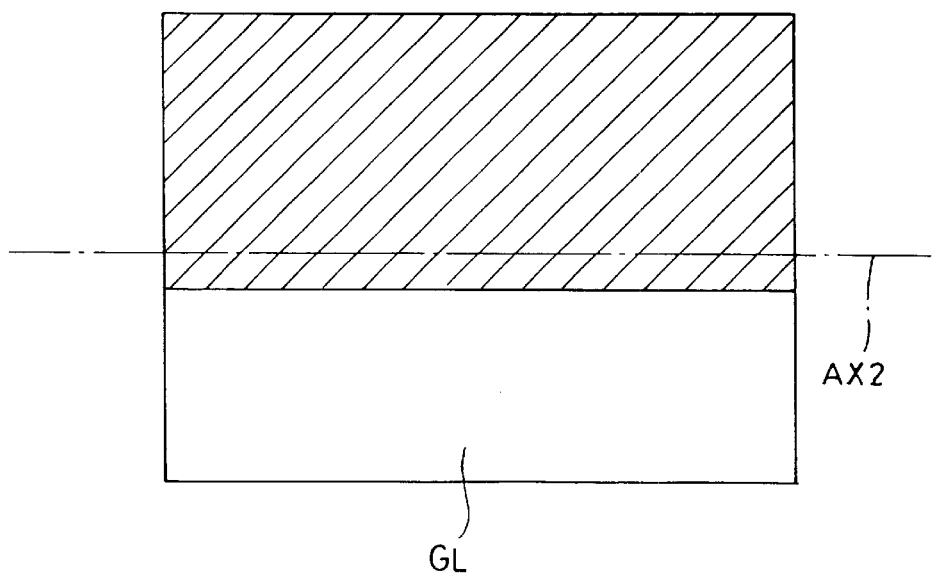

The tenth embodiment is a prism optical system which is composed of a single radial type gradient index lens element as shown in FIGS. 10A, 10B or 10C. In FIG. 10A, a first surface $r_1$ and an optical axis $AX_2$ of a medium of the radial type gradient index lens element are eccentric from an optical axis $AX_1$ of the optical system. The optical system preferred as the tenth embodiment images a light bundle which is incident obliquely at an angle of 27° relative to the optical axis $AX_1$ of the optical system in the vicinity of a surface $r_2$ of the optical system with the single radial type gradient index lens element.

Though chromatic aberration is produced due to a prism function of the first surface $r_1$ in case of a lens element which is made of an ordinary glass material and has such a shape as that shown in the drawing, chromatic aberration is corrected by the radial type gradient index lens element in the tenth embodiment. In this case, it is desirable for correcting chromatic aberration to satisfy the condition (3). If the condition (3) is not satisfied, chromatic aberration will be undercorrected.

The optical system preferred as the tenth embodiment is configured to satisfy the condition (3) and corrects chromatic aberration as described above.

Though the first surface of the radial type gradient index lens element is eccentric from the optical axis of the optical system in FIG. 10A, it is possible to compose a similar prism optical system by making only a surface or a medium eccentric.

In FIG. 10B, an optical axis $AX_2$ of a medium of a radial type gradient index lens element is eccentric from an optical axis $AX_1$ of an optical system. In this drawing, a reference symbol $L_1$ represents a principal ray which is incident on the optical axis $AX_1$ of the optical system, and reference symbols $L_2$ and $L_3$ designate subordinate rays respectively. A prism optical system can be obtained by making the optical axis $AX_2$ of the medium eccentric from the optical axis of the optical system as shown in this drawing.

The radial type gradient index lens element which is shown in FIG. 10B is obtained by taking out only the portion of a radial type gradient index lens element which is hatched in FIG. 10C and can compose the optical system shown in FIG. 10B.

When an optical system uses at least one gradient index lens element which has a refractive index distribution in its medium and an optical axis of a surface or medium of the gradient index lens element is eccentric from an optical axis of the optical system, it is desirable for correcting chromatic aberration to satisfy the condition (3).

Figure 11:
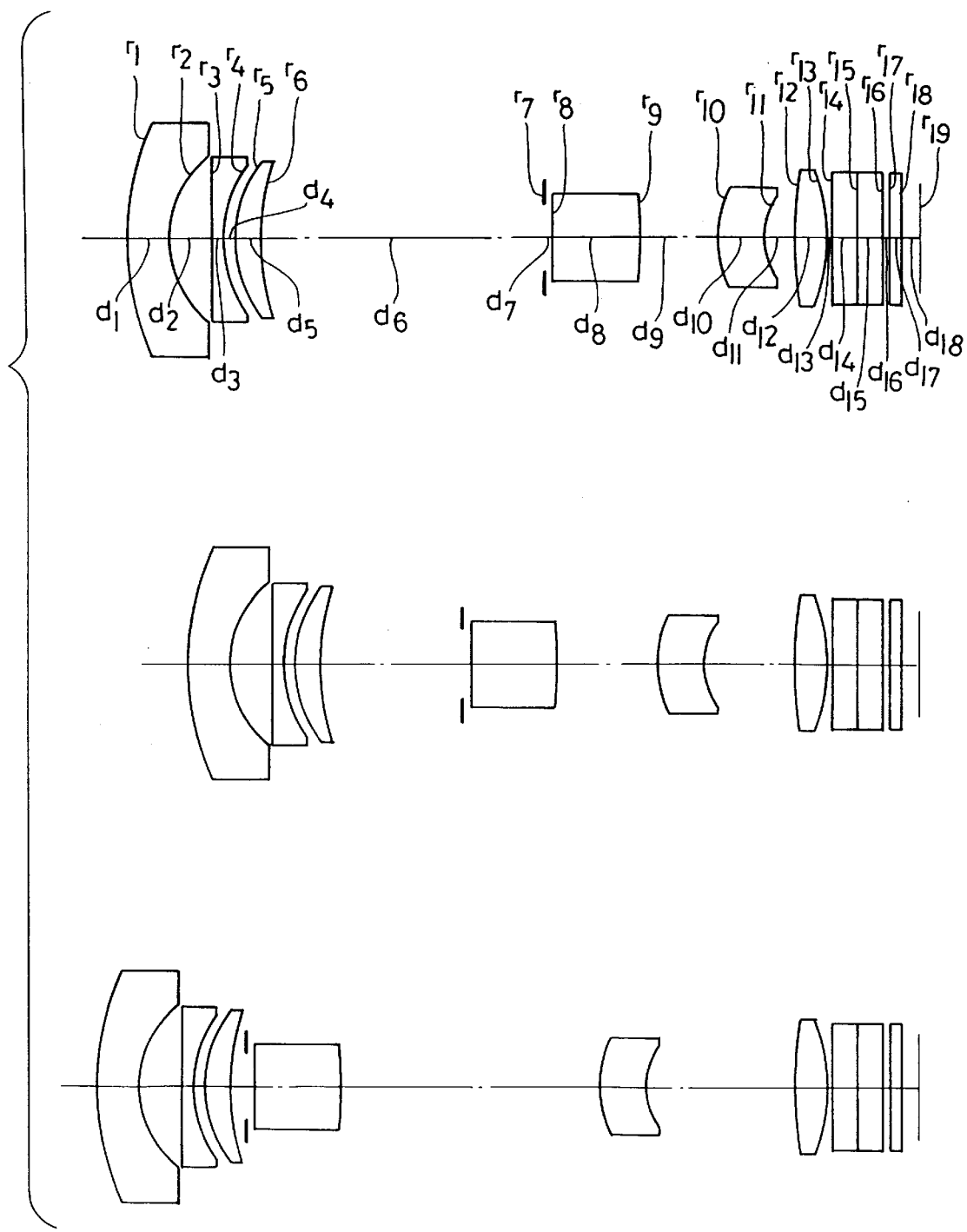

The eleventh embodiment is a zoom optical system which is composed, in order from the object side as shown in FIG. 11, of a first lens unit having a negative refractive power, a second lens unit having a positive refractive power, a third lens unit having a negative refractive power and a fourth lens unit having a positive refractive power. Plane parallel plates which are disposed on the image side of the optical system, i.e., on the image side of the fourth lens unit, are filters such as a low pass filter and a infrared cut filter, and a cover glass plate for an image pickup device.

In the optical system preferred as the eleventh embodiment, the first lens unit and the second lens unit are movable for changing a magnification and mainly have a vari-focal function, the third lens unit is movable for changing the magnification and mainly functions to correct a deviation of an image surface caused by changing the magnification, and the fourth lens unit is kept stationary during the change of the magnification and functions to image a light bundle coming from the third lens unit.

The eleventh embodiment is a zoom optical system which is composed of four negative, positive, negative and positive lens units, and configured compact and manufactured at a low cost by using a radial type gradient index lens element in the optical system. The eleventh embodiment is capable of correcting aberrations favorably though it is configured compactly by using the radial type gradient index lens element in the second lens unit which has a vari-focal function so as to strengthen a refractive power of this lens unit. Further, the second lens unit is composed only of the single radial gradient index lens element, thereby lowering the manufacturing cost.

For favorably correcting off-axial aberrations such as lateral chromatic aberration and distortion, the first lens unit is composed, in order from the object side, of a negative lens element, a negative lens element and a positive lens element. Further, the lens unit which is disposed on the image side, i.e., the fourth lens unit is kept stationary during the change of the magnification, thereby being capable of suppressing variations of aberrations due to the change of the magnification. Furthermore, an aperture stop is disposed on the object side of the second lens unit and moved together with the second lens unit for reducing variations of aberrations during the change of the magnification. By moving the radial type gradient index lens element together with the aperture stop, it is possible to reduce a diameter of the radial type gradient index lens element and lower a manufacturing cost. Disposed on the image side of the radial type gradient index lens element (the second lens unit) are a negative lens element (the third lens unit) and a positive lens element (the fourth lens unit) in order from the object side so as to compose a lens system of a small number of lens elements. Accordingly, the second lens unit, the third lens unit and the fourth lens unit which are disposed on the image side of the first lens unit compose a triplet type lens system, thereby being capable of correcting aberrations effectively with a small number of lens elements. A positive lens element is disposed on the image side so as to allow off-axial rays to be incident on an image surface nearly in parallel with an optical axis. All the lens elements other than the radial type gradient index lens element are homogeneous spherical lens elements which are effective to reduce influences due to eccentricities and lower a manufacturing cost.

Figure 12A:
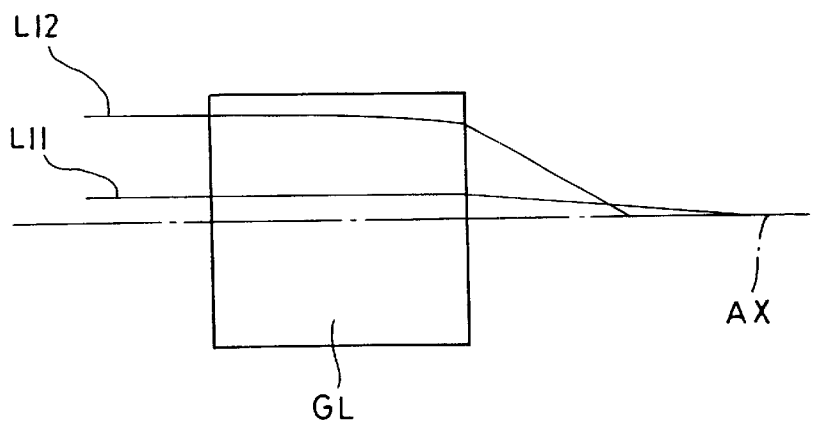
Figure 12B:
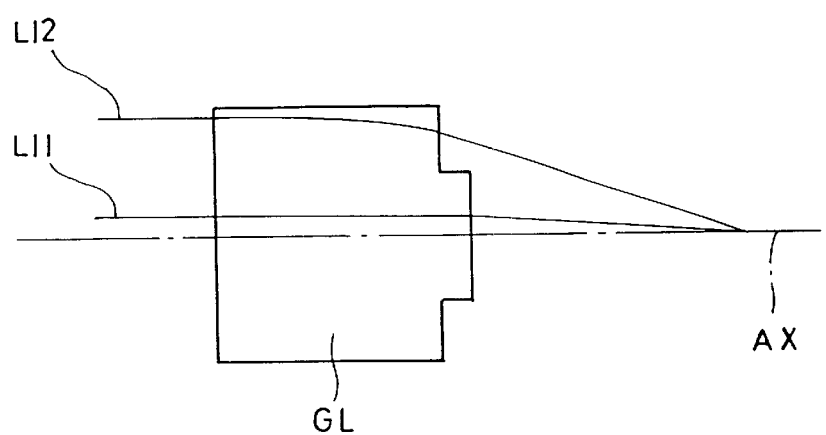
Figure 12C:
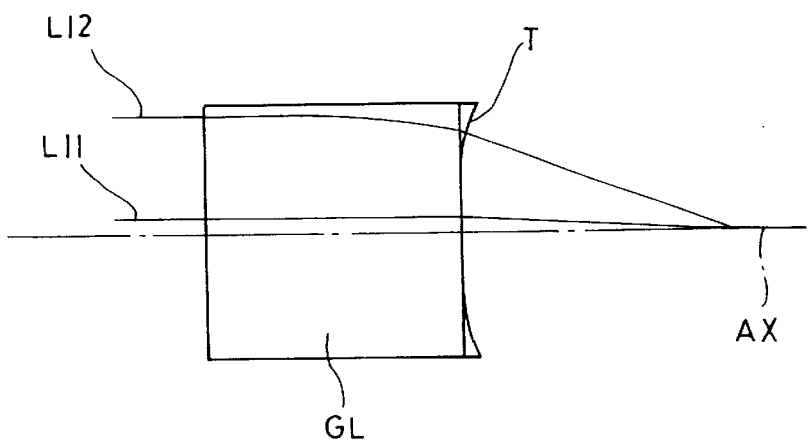

The twelfth embodiment illustrated in FIGS. 12A, 12B and 12C exemplifies methods to correct an outer circumferential portion of a radial type gradient index lens element which is deviated from design values. In FIG. 12A, a reference symbol AX represents an optical axis, a reference symbol GL designates a radial type gradient index lens element, a reference symbol $L_{11}$ denotes an axial light bundle which has a low aperture ratio in the vicinity of the optical axis, and a reference symbol $L_{12}$ represents an axial light bundle which is apart from the optical axis and has a high aperture ratio.

The gradient index lens element GL shown in FIG. 12A has an outer circumference in which a refractive index distribution is deviated from a satisfactory distribution and an axial ray passes as shown in the drawing.

FIG. 12B exemplifies a working of an outer circumferential portion of the gradient index lens element for correcting spherical aberration.

It is possible to correct the outer circumferential portion by adding a transparent material such as a glass or plastic material as shown in FIG. 12C.

Figure 14A:
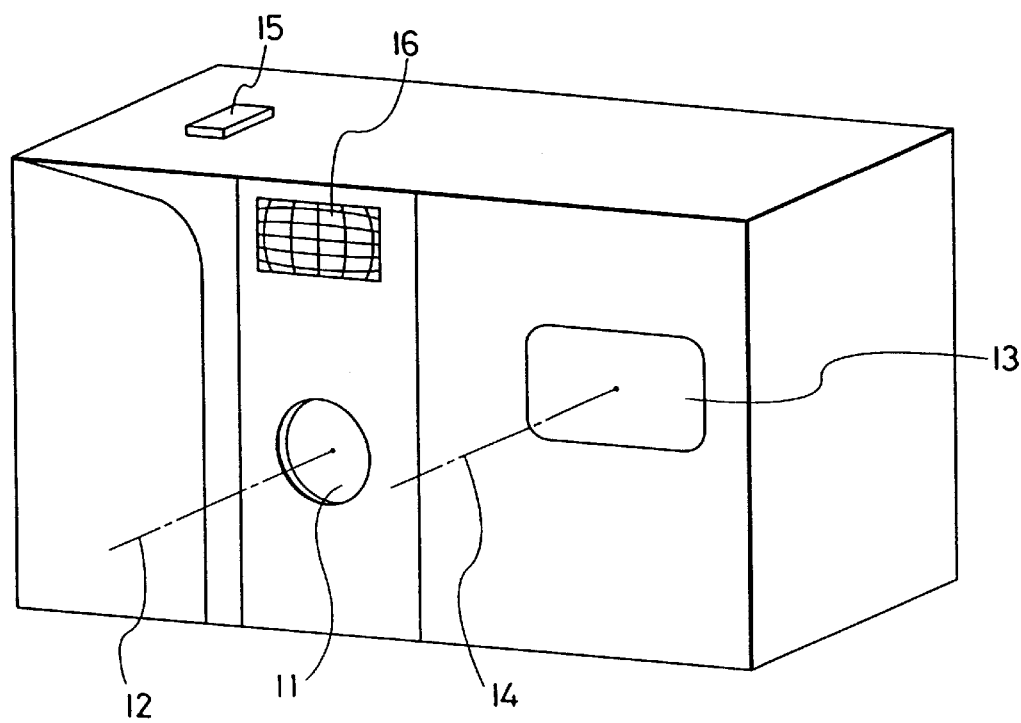
FIGS. 14A, 14B and 14C show diagrams illustrating electronic cameras in which the optical system according to the present invention is assembled.
Figure 14B:
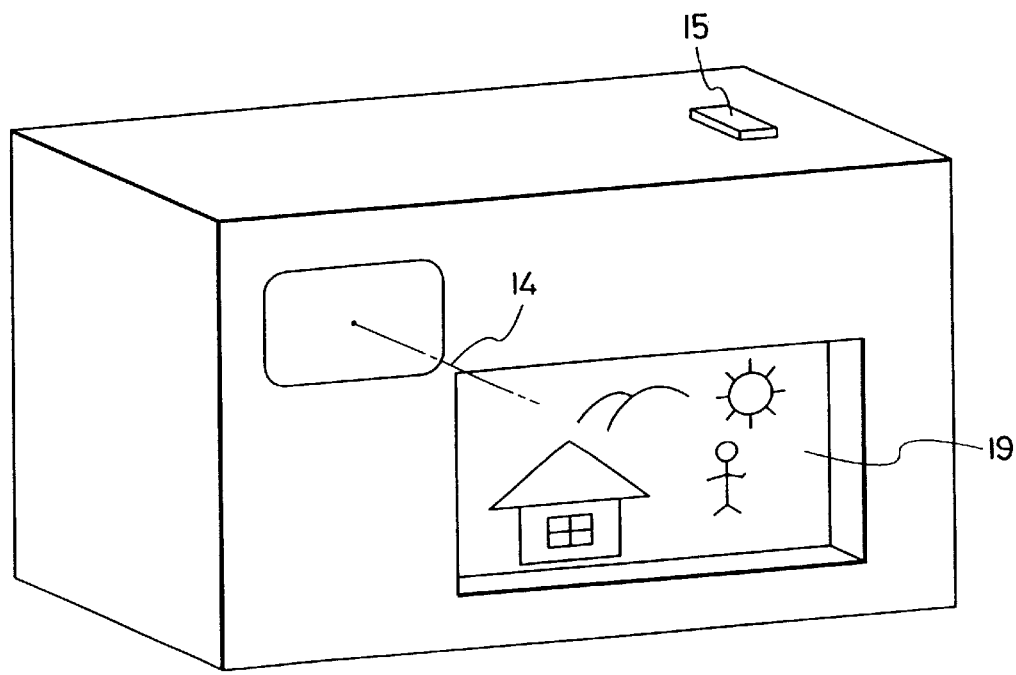
Figure 14C:
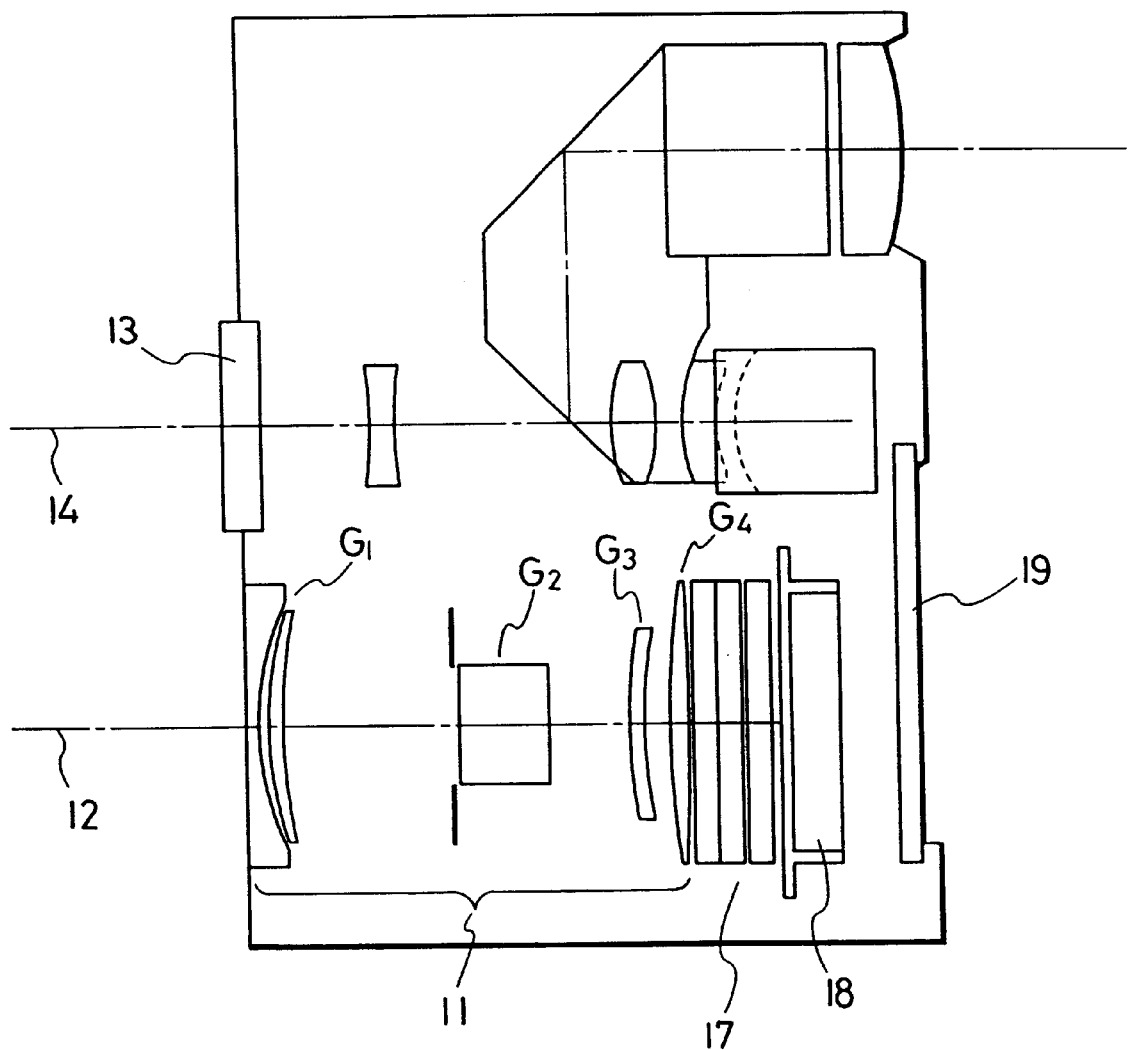

The optical system according to the present invention described above is usable as an objective optical system for image pickup apparatus such as electronic cameras. For example, it is usable as a photographic objective optical system for electronic cameras as shown in FIGS. 14A, 14B and 14C. Out of these drawings, FIG. 14A is a perspective view of an electronic camera as seen from the front, FIG. 14B is a perspective view of the electronic camera as seen from the rear and FIG. 14C is a diagram illustrating an arrangement of the objective optical system in the electronic camera. In these drawings, a reference numeral 11 represents a photographic optical system which has a photographic optical path 12, a reference numeral 13 designates a viewfinder optical system which has an optical path 14 for a viewfinder, a reference numeral 15 denotes a shutter, a reference numeral 16 represents a flash lamp, a reference numeral 17 designates a filter, a reference numeral 18 denotes a electronic image pickup device, and a reference numeral 19 represents a liquid crystal monitor.

The photographic optical system 11 shown in FIG. 14C is the first embodiment of the present invention which is illustrated in FIG. 1, and is composed, in order from the object side (in order from the left side to the right side in FIG. 14C), of a first lens unit $G_1$ having a negative refractive power, a second lens unit $G_2$ having a positive refractive power, a third lens unit having a negative refractive power, a fourth lens unit $G_4$ having a positive refractive power, the infrared cut filter 17 and the electronic image pickup device 18 which is disposed on an image surface of the photographic optical system. An image which is picked up by the electronic image pickup device 18 or recorded by a recorder (not shown) in this optical system is displayed on the liquid crystal monitor 19.

I claim:

1. An optical system comprising in order from the object side:

a first lens unit having negative refractive power;

a second lens unit having positive refractive power;

a third lens unit having negative refractive power; and a fourth lens unit having positive refractive power, wherein the first lens unit is kept stationary during a change of a magnification and consists of two lens elements.

2. An optical system according to claim 1, wherein the first lens unit consists, in order from the object side, of a negative lens element and a positive lens element.

3. An optical system according to claim 1, wherein a magnification is changed by varying an airspace between the first lens unit and the second lens unit and an airspace between the second lens unit and the third lens unit.

4. An optical system according to claim 3, wherein the fourth lens unit is kept stationary during the change of the magnification.

5. An optical system according to claim 1, wherein the third lens unit is moved for focusing.

6. An optical system according to claim 1, wherein the third lens unit consists of a negative lens element.

7. An optical system comprising in order from the object side:

a first lens unit having negative refractive power, a second lens unit having positive refractive power, a third lens unit having negative refractive power; and a fourth lens unit having positive refractive power, wherein the first lens unit consists of two lens elements and the fourth lens unit consists of a positive lens element.

8. An optical system according to claim 7, wherein the first lens unit consists of a negative lens element and a positive lens element in order from the object side.

9. An optical system according to claim 7, wherein a magnification is changed by varying an airspace between the first lens unit and the second lens unit, an airspace between the second lens unit and the third lens unit and an airspace between the third lens unit and the fourth lens unit.

10. An optical system according to claim 9, wherein the fourth lens unit is kept stationary during the change of the magnification.

11. An optical system according to claim 7, wherein the third lens unit is moved for focusing.

12. An optical system according to claim 7, wherein the third lens unit consists of a negative lens element.

13. An optical system comprising in order from the object side:

a first lens unit having negative refractive power, a second lens unit having positive refractive power, a third lens unit having negative refractive power; and a fourth lens unit having positive refractive power, wherein an aperture stop is disposed between the first lens unit and the second lens unit, and wherein a magnification is changed by varying an airspace between the first lens unit and the second lens unit, an airspace between the second lens unit and the third lens unit, and an airspace between the third lens unit and the fourth lens unit.

14. An optical system according to claim 13, wherein the third lens unit is moved to change a magnification and the aperture stop is moved together with the second lens unit.

15. An optical system according to claim 13, wherein the fourth lens unit is kept stationary during a change of the magnification.

16. An optical system according to claim 13, wherein the third lens unit is moved for focusing.

17. An optical system according to claim 13, wherein the third lens unit consists of a negative lens element.

* * * * *